(12) United States Patent
Meagher et al.

(10) Patent No.: US 8,321,194 B2
(45) Date of Patent: Nov. 27, 2012

(54) REAL TIME MICROGRID POWER ANALYTICS PORTAL FOR MISSION CRITICAL POWER SYSTEMS

(75) Inventors: Kevin Meagher, Raleigh, NC (US); David Loiselle, Wake Forest, NC (US); Rodger Koopman, Raleigh, NC (US)

(73) Assignee: Power Analytics Corporation, San Diego, CA (US)

( * ) Notice: Subject to any disclaimer, the term of this patent is extended or adjusted under 35 U.S.C. 154(b) by 237 days.

(21) Appl. No.: 12/895,586

(22) Filed: Sep. 30, 2010

(65) Prior Publication Data

US 2011/0082596 A1     Apr. 7, 2011

Related U.S. Application Data

(60) Provisional application No. 61/247,917, filed on Oct. 1, 2009.

(51) Int. Cl.
*G06F 17/50* (2006.01)
*G06F 7/60* (2006.01)
*G06G 7/54* (2006.01)
*G05D 3/12* (2006.01)

(52) U.S. Cl. .................. 703/14; 703/1; 703/2; 703/13; 703/18; 700/286; 700/291

(58) Field of Classification Search .................. 703/1, 2, 703/13, 14, 18; 700/286, 291
See application file for complete search history.

(56) References Cited

U.S. PATENT DOCUMENTS

| | | | | |
|---|---|---|---|---|
| 7,729,808 | B2 * | 6/2010 | Nasle et al. | 700/286 |
| 7,826,990 | B2 * | 11/2010 | Nasle et al. | 702/85 |
| 7,840,395 | B2 * | 11/2010 | Nasle et al. | 703/18 |
| 7,840,396 | B2 * | 11/2010 | Radibratovic et al. | 703/18 |
| 7,844,439 | B2 * | 11/2010 | Nasle et al. | 703/18 |
| 7,844,440 | B2 * | 11/2010 | Nasle et al. | 703/18 |
| 8,036,872 | B2 * | 10/2011 | Nasle | 703/18 |
| 8,126,685 | B2 * | 2/2012 | Nasle | 703/4 |
| 8,131,401 | B2 * | 3/2012 | Nasle | 700/286 |
| 8,132,049 | B2 * | 3/2012 | Yasukawa et al. | 714/26 |
| 8,155,908 | B2 * | 4/2012 | Nasle et al. | 702/85 |

(Continued)

FOREIGN PATENT DOCUMENTS

EP     2081273     7/2009

OTHER PUBLICATIONS

Hasiotis et al. "Sensation: A Middleware Integration Platform for Pervasive Applications in Wireless Sensor Networks", May 2005.*

(Continued)

*Primary Examiner* — Shambhavi Patel
(74) *Attorney, Agent, or Firm* — Procopio, Cory, Hargreaves & Savitch LLP

(57) ABSTRACT

Systems and method for providing a microgrid power analytics portal for mission critical power systems are provided. The techniques disclosed herein provides for real-time modeling, evaluation, and commodity market pricing and optimization for an electrical network that includes microgrids using data collected from virtually any digital data source. The portal is platform independent and can be configured to collect and aggregate real-time data from sensors interfaced with components of the electrical network regardless of proprietary architectures or vendor-specific limitations imposed by the sensors or data collection software.

17 Claims, 13 Drawing Sheets

U.S. PATENT DOCUMENTS

| | | | |
|---|---|---|---|
| 8,165,723 B2* | 4/2012 | Nasle | 700/286 |
| 8,170,856 B2* | 5/2012 | Nasle | 703/14 |
| 8,180,622 B2* | 5/2012 | Nasle | 703/18 |
| 2005/0033481 A1 | 2/2005 | Budhraja et al. | |
| 2007/0192078 A1* | 8/2007 | Nasle et al. | 703/14 |
| 2007/0239373 A1* | 10/2007 | Nasle | 702/58 |
| 2007/0288626 A1 | 12/2007 | Cunningham et al. | |
| 2008/0262820 A1* | 10/2008 | Nasle | 703/18 |
| 2008/0263469 A1* | 10/2008 | Nasle et al. | 715/771 |
| 2009/0063122 A1 | 3/2009 | Nasle et al. | |
| 2009/0066287 A1 | 3/2009 | Pollack et al. | |
| 2009/0076749 A1* | 3/2009 | Nasle | 702/62 |
| 2009/0083019 A1* | 3/2009 | Nasle | 703/18 |
| 2009/0105998 A1* | 4/2009 | Radibratovic et al. | 703/2 |
| 2009/0113049 A1* | 4/2009 | Nasle et al. | 709/224 |
| 2009/0149972 A1 | 6/2009 | Nasle et al. | |
| 2010/0023309 A1* | 1/2010 | Radibratovic et al. | 703/18 |
| 2010/0049494 A1* | 2/2010 | Radibratovic et al. | 703/13 |
| 2010/0168931 A1* | 7/2010 | Nasle | 700/291 |
| 2010/0268396 A1* | 10/2010 | Nasle et al. | 700/291 |
| 2011/0082596 A1* | 4/2011 | Meagher et al. | 700/291 |
| 2011/0082597 A1* | 4/2011 | Meagher | 700/291 |

OTHER PUBLICATIONS

Hiner et al. "Transaction-Level Modeling for Sensor Networks Using SystemC", 2010.*

Hu et al. "Reconfigurable Middleware for Sensor Based Applications", ACM 2006.*

Handziski et al. "Flexible Hardware Abstraction for Wireless Sensor Networks", 2005.*

Gigan et al. "Sensor Abstraction Layer: a unique software interface to effectively manage sensor networks", IEEE 2007.*

Hill et al. "The Platforms Enabling Wireless Sensor Networks", Communications of the ACM Jun. 2004/vol. 47, No. 6.*

Choi et al. "Device Driver Abstraction for Multithreaded Sensor Network Operating Systems", EWSN 2008, LNCS 4913, pp. 354-368, 2008.*

Yau et al. "A context-sensitive middleware for dynamic integration of mobile devices with network infrastructures", J. Parallel Distrib. Comput. 64 (2004) 301-317.*

Trevathan et al. "Sensor Abstraction Layer", Softw. Pract. Exper. 2010; 00:1-7.*

International Search Report and Written Opinion issued on May 18, 2011, in corresponding application No. PCT/US2010/051213, 7 pages.

International Search Report and Written Opinion issued on Jun. 1, 2011, in corresponding application No. PCT/US2010/051212, 9 pages.

Xia et al. "The MicroGrid: Using Online Simulation to Predict Application Performance in Diverse Grid Network Environments," IEEE Computer Society, Proceedings of the Second International Workshop on Challenges of Large Applications in Distributed Environments, Jun. 7, 2004, 10 pages.

* cited by examiner

REAL TIME MICROGRID POWER ANALYTICS PORTAL FOR MISSION CRITICAL POWER SYSTEMS

RELATED APPLICATION INFORMATION

This application claims the benefit under 35 U.S.C. §119(e) of U.S. Provisional Application Ser. No. 61/247,917, filed Oct. 1, 2009 and entitled "REAL-TIME MICRO GRID POWER ANALYTICS PORTAL FOR MISSION CRITICAL POWER SYSTEMS," and which is incorporated herein by reference in its entirety as if set forth in full. This application is also related to U.S. patent application Ser. No. 12/895,597, entitled "MICROGRID MODEL BASED AUTOMATED REAL TIME SIMULATION FOR MARKET BASED ELECTRIC POWER SYSTEM OPTIMIZATION," filed on Sep. 30, 2010, which in turn claims the benefit under 35 U.S.C. §119(e) of U.S. Provisional Application Ser. No. 61/247,915, filed Oct. 1, 2009 and entitled "MICROGRID MODEL BASED AUTOMATED REAL TIME SIMULATION FOR MARKET BASED ELECTRIC POWER SYSTEM OPTIMIZATION," both of which are incorporated herein by reference in their entirety as if set forth in full.

BACKGROUND

I. Technical Field

The present invention relates generally to computer modeling and management of systems and, more particularly, to computer simulation techniques with real-time system monitoring and prediction of electrical system performance.

II. Background

Electric generation has traditionally been performed by large-scale centralized facilities that are powered by fossil fuels or nuclear power or hydropower. These systems were monolithic and unidirectional systems. Smart grid technology has evolved to allow multidirectional communications and transmission of power. The smart grid increases the connectivity between power generation companies and power distributors. The smart grid also provides digital two-way communications with end users. For example, consumers can have smart meters installed at their premises that can report energy usages patterns to the utility for monitoring and billing purposes. Consumers may also have smart devices installed in their homes that can receive information from energy providers over the smart grid that inform the devices when demand for electricity is high causing the cost of electricity to rise. Some devices may reduce electricity usage during peak periods or defer usage until demand decreases. For example, an electric hot water heater may defer heating water in its tank until low demand periods when the cost of electricity may be significantly lower that during peak demand periods. In another example, non-essential devices may be shut down during peak demand periods to reduce load on the system. For example, in some areas, consumers can contract to allow an electric utility company to switch off their air conditioner systems for short periods of time during peak demand periods.

Distributed electrical power generation has also evolved and has become another aspect of the smart grid. Distributed generation systems include smaller-scale power generation facilities that can be used in addition to or instead of the traditional centralized facilities. Microgrids A microgrid is a localized grouping of electrical resources and loads that are typically connected to and synchronized with the traditional centralized electrical grid (also referred to herein as the macrogrid). A microgrid is typically connected to the macrogrid at a single point of connection, and the microgrid can typically disconnect from the macrogrid and function as an autonomous power system. The microgrid typically includes control independent of the macrogrid that allows the microgrid to be adjusted for changes in operating parameters, such as local load levels, independently of the macrogrid. Microgrids can be used as part of a distributed energy system where energy is generation is decentralized and energy is generated from many small sources. For example, a microgrid may be a smaller generation station that is designed to supply power to a single building or set of buildings, such as a hospital or office building complex. A microgrid might also be designed to power a larger area, such as a university campus or industrial complex that includes a larger number of buildings and can include greater load. Depending upon the specific implementation, the microgrid can have varying reliability requirements. For example, an implementation of a microgrid at a hospital or an industrial complex may have greater reliability requirements than a microgrid supplying power to a residential dormitories and classrooms on a university campus.

Microgrids can provide a hybrid power infrastructure where power from the conventional macrogrid is used in combination with the power generated onsite by the microgrid. Electrical power is often sold on complex market, and distributed energy systems, such as microgrids, add additional complexity to the market. Microgrids can sell excess power to the macrogrid and can purchase power from the macrogrid in order to meet local demand in excess of the generation capacity of the microgrid.

Optimization of market-based power systems is a critical component of distributed energy generation management. Demand for electricity and market conditions, such as pricing and availability of electrical power, create a complex market, and consideration must be taken for overall availability and reliability of the system. Various scenarios under consideration can impact or be impacted by external events, such as routine maintenance, system changes, or unplanned events that impact the electrical power network. Conventional approaches to market-based optimization do not take into account these potential effects on the power market.

Conventional systems provide market-based pricing of distributed energy off-line and do not consider real-time power network conditions. Conventional systems also do not provide for real-time evaluation of microgrid data to generated predicted impacts on availability and reliability of the microgrids.

Computer models of complex systems, such as microgrids, enable improved system design, development, and implementation through techniques for off-line simulation of the system operation. That is, system models can be created that computers can "operate" in a virtual environment to determine design parameters. All manner of systems can be modeled, designed, and virtually operated in this way, including machinery, factories, electrical power and distribution systems, processing plants, devices, chemical processes, biological systems, and the like. Such simulation techniques have resulted in reduced development costs and superior operation.

Design and production processes have benefited greatly from such computer simulation techniques, and such techniques are relatively well developed, but such techniques have not been applied in real-time, e.g., for real-time operational monitoring and management. In addition, predictive failure analysis techniques do not generally use real-time data that reflect actual system operation. Greater efforts at real-time operational monitoring and management would provide more accurate and timely suggestions for operational decisions, and such techniques applied to failure analysis would provide improved predictions of system problems before they occur. With such improved techniques, operational costs could be greatly reduced.

For example, mission critical electrical systems, e.g., for data centers or nuclear power facilities, must be designed to ensure that power is always available. Thus, the systems must be as failure proof as possible, and many layers of redundancy must be designed in to ensure that there is always a backup in case of a failure. It will be understood that such systems are highly complex, a complexity made even greater as a result of the required redundancy. Computer design and modeling programs allow for the design of such systems by allowing a designer to model the system and simulate its operation. Thus, the designer can ensure that the system will operate as intended before the facility is constructed.

Once the facility is constructed, however, the design is typically only referred to when there is a failure. In other words, once there is failure, the system design is used to trace the failure and take corrective action; however, because such design are complex, and there are many interdependencies, it can be extremely difficult and time consuming to track the failure and all its dependencies and then take corrective action that does not result in other system disturbances.

Conventional system modeling and analytics solutions typically require a vendor-specific data collection engine that is proprietary and incompatible with competing technologies. This creates a significant barrier to widespread deployment of any one particular system modeling and analytics solution, because new adopters with existing modeling and analytics solutions would be required to invest a significant amount of money in order to switch to a new system. Conventional microgrid management systems create "islands" of data that are isolated from other systems. As a result, the overall growth and adoption of microgrid management systems is inhibited.

SUMMARY

Systems and method for providing a microgrid power analytics portal for mission critical power systems are provided. The techniques disclosed herein provides for real-time modeling, evaluation, and commodity market pricing and optimization for an electrical network that includes microgrids using data collected from virtually any digital data source. The portal is platform independent and can be configured to collect and aggregate real-time data from sensors interfaced with components of the electrical network regardless of proprietary architectures or vendor-specific limitations imposed by the sensors or data collection software.

In an embodiment, a system for real-time modeling of electrical system performance of a microgrid electrical system is provided. The system includes a plurality of sensors interfaced with components of the electrical system. The system also includes an analytics server that comprises a virtual system modeling engine configured to generate predicted data output for the electrical system utilizing a virtual system model of the electrical system. The system also includes a microgrid portal that includes a portal configuration engine, a device driver database, and a portal access engine. The device driver database is configured to store a plurality of device drivers associated with sensors interfaced with components of an electrical system. The portal configuration engine is configured to receive a copy of the virtual model of the electrical system, parse the virtual model of the electrical system to identify sensor devices interfaced with components of the electrical system, identify device drivers in the device driver database that can be used to interface the each sensor device with the analytic server; and send the identified device drivers to the analytic server, wherein the analytics server is configured to receive the device drivers from the portal configuration engine, install the device drivers, and establish a bidirectional communication link with the plurality of sensors interfaced with components of the electrical system using the device drivers. The a portal access engine is configured to receive real-time data, analytics data, and predicted data from the analytics server and display the data to an operator on a display of the client terminal.

In another embodiment, a computer implemented method for real-time modeling of the performance of a microgrid electrical system where one or more processors are programmed to perform steps of the method. The method includes receiving a virtual model of a microgrid electrical network, parsing the virtual model of the electrical system to identify a plurality of sensor devices interfaced with components of the microgrid electrical network, identify device drivers in the device driver database that can be used to interface the each sensor device with the analytic server; sending the identified device drivers to an analytics server, receiving and installing the device drivers on the analytics server, establishing a bidirectional communication link with the plurality of sensors interfaced with components of the electrical system using the device drivers; and acquiring real-time data from the plurality of sensors using the device drivers.

These and other features, aspects, and embodiments of the invention are described below in the section entitled "Detailed Description."

BRIEF DESCRIPTION OF THE DRAWINGS

For a more complete understanding of the principles disclosed herein, and the advantages thereof, reference is now made to the following descriptions taken in conjunction with the accompanying drawings, in which.

DETAILED DESCRIPTION

Figure 1:
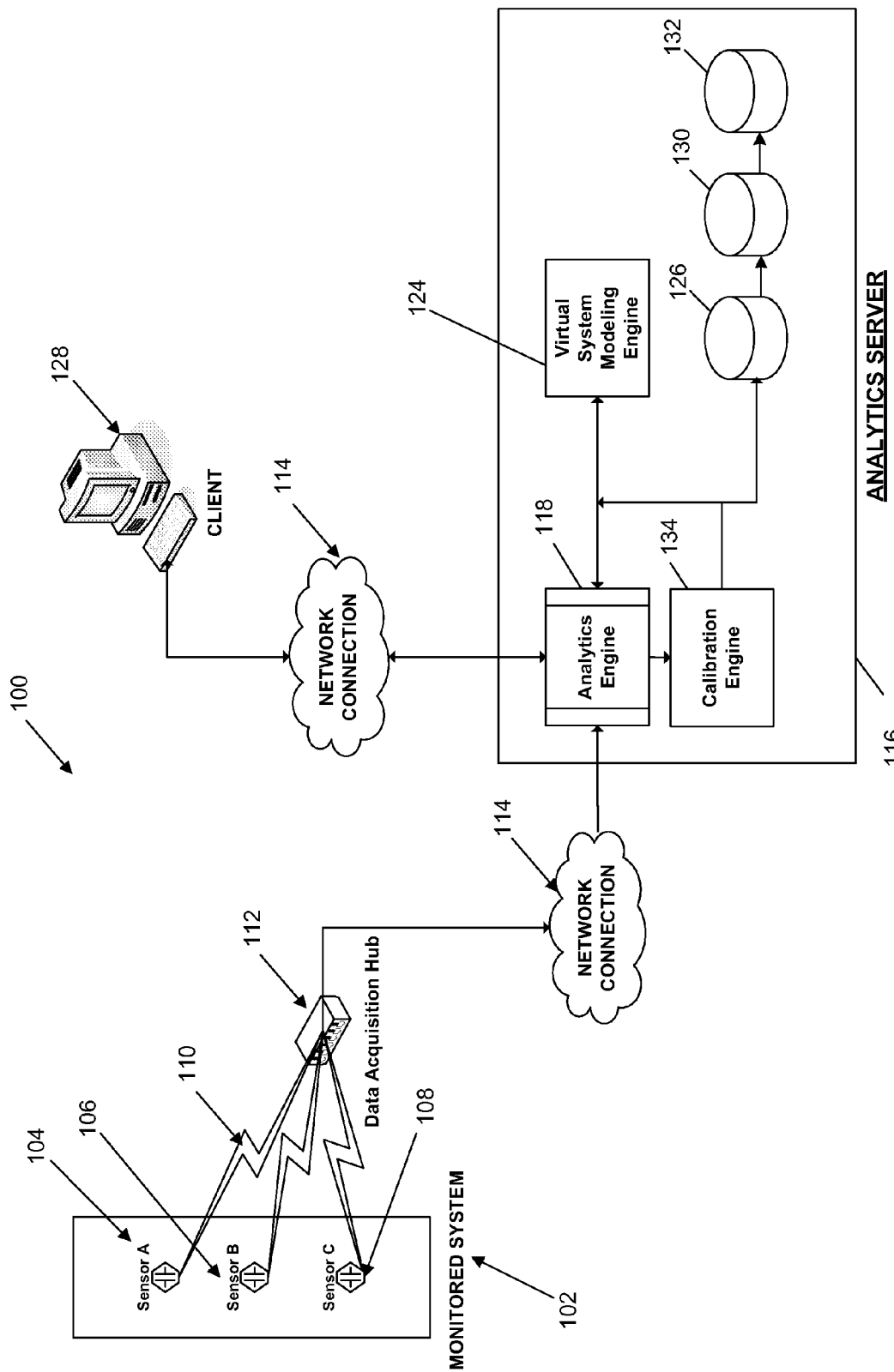
FIG. 1 is an illustration of a system for utilizing real-time data for predictive analysis of the performance of a monitored system, in accordance with one embodiment.

Systems and method for providing a microgrid power analytics portal for mission critical power systems are provided. The microgrid portal can be used by microgrid operators to collect data from sensors interfaced with components of the microgrid. A typical mission critical power system might have hundreds, if not thousands, of sensors collecting data throughout the mission-critical infrastructure of the electrical system. Often, the devices used to collect data from the electrical system include proprietary, vendor-specific interfaces, and a typical electrical system can include data collection equipment from multiple vendors. One aspect of the microgrid portal is that the portal can be configured to collect data from various data sources on the microgrid without compromising underlying data acquisition systems, process controls, or supervisory control and data acquisition (SCADA) systems.

One aspect of the microgrid portal is that the portal can be configured to provide advanced power system modeling and analytics for microgrids. The portal can be configured to provide real-time modeling and evaluation of the electrical system, as well as commodity market pricing for electricity and optimization of operation of the microgrid to meet the operational objectives of the microgrid operator. For example, objectives of a microgrid operator might include minimizing the annual cost of operation, minimizing the carbon footprint, minimizing the peak load, minimizing public utility consumption, or a combination thereof. These objectives can vary based on time, energy source reliability, or other factors that can impact the operating objectives of the microgrid operator.

The advanced power system modeling and analytics techniques provided include a real-time model and a virtual model of the microgrid. The real-time model represents a current state of the electrical system can be developed by collecting data from sensors interfaced with the various components of the electrical system. The virtual model of the electrical system mirrors the real-time model of the electrical system and can be used to generate predictions regarding the performance, availability, and reliability of cost and reliability of various distributed energy sources and to predict the price of acquiring energy from these sources. This advanced power system modeling and associated analytics are vital to determining what power network constraints may exist that would negatively impact the microgrid. As these potential constraints are dynamic, iteratively monitoring the state of the microgrid using real-time data is essential to achieving a reliable and sustainable market forecast. For example, a typical microgrid includes local power generation sources, and these local generation sources are an important aspect of market optimization considerations. The operator of the microgrid can define a desired use or mix of generation sources that includes locally generated power from local power generation sources as well as power from other electrical providers from the macrogrid. However, the desired market optimizations cannot be realized if the desired mix of generation sources cannot be maintained for the duration of the period of time used to calculate the market optimizations. For example, some operators may use a rolling 24-hour period or rolling 12-hour period on which market optimizations are based, but if the desired mix of energy resources cannot be achieved throughout that entire period, the market optimizations cannot be realized. Conventional systems for making market predictions do not include these real-time modeling of the microgrid, which can result in the inaccurate market forecasts. For example, if critical elements of the microgrid are already overloaded or unavailable (e.g., due to maintenance or other localized events), the conventional solutions may not recognize this problem because they do not use a real-time model of the microgrid as well as a virtual model of the microgrid when making forecasts. The systems and methods disclosed herein overcome these problems by using both a real-time model of the system that represents the current state of the system as well as a virtual model of the system can be adapted and synchronized to the changing conditions on the microgrid. As a result, the market forecasts generated by the techniques disclosed herein are more accurate and reliable than those generated by conventional systems.

In an embodiment, the virtual model can be used to test "what if" scenarios, such as routine maintenance, system changes, and unplanned events, which can impact the electrical power network. The virtual model can also be used to predict the effect of various scenarios on microgrid utilization and capacity.

Embodiments of the systems and methods disclosed herein can also be used to monitor operation of the smart grid and to facilitate electricity trading with the macrogrid. For example, if the microgrid has excess capacity, electricity can be sold to the macrogrid. Conversely, if the utilization of the microgrid exceeds the microgrid capacity, electricity can be purchased from the macrogrid to meet the current utilization. The capacity of the microgrid can be monitored in real-time to determine whether electricity can be sold or electricity. All transactions between the public electric service on the macrogrid and the microgrid infrastructure are closely monitored, and rate and pricing information for the management of electricity exchange are also maintained. Closely monitoring this information and updating the virtual and real time models accordingly allows the systems and methods disclosed herein to optimize energy consumption to meet various objectives of the microgrid operator. For example, objectives of a microgrid operator might include minimizing the annual cost of operation, minimizing the carbon footprint, minimizing the peak load, minimizing public utility consumption, or a combination thereof. These objectives can vary based on time, energy source reliability, or other factors that can impact the operating objectives of the microgrid operator. The portal can facilitate sharing the information, such as which microgrids currently have excess generating capacity, which can be used to more accurate price electricity and to forecast the cost of electricity.

As used herein, a system denotes a set of components, real or abstract, comprising a whole where each component interacts with or is related to at least one other component within the whole. Examples of systems include machinery, factories, electrical systems, processing plants, devices, chemical processes, biological systems, data centers, aircraft carriers, and the like. An electrical system can designate a power generation and/or distribution system that is widely dispersed, i.e., power generation, transformers, and/or electrical distribution components distributed geographically throughout a large region, or bounded within a particular location, e.g., a power plant within a production facility, a bounded geographic area, on board a ship, etc.

A network application is any application that is stored on an application server connected to a network, e.g., local area network, wide area network, etc., in accordance with any contemporary client/server architecture model and can be accessed via the network. In this arrangement, the network application programming interface (API) resides on the application server separate from the client machine. The client interface would typically be a web browser, e.g. INTERNET EXPLORER™, FIREFOX™, NETSCAPE™, etc., that is in communication with the network application server via a network connection, e.g., HTTP, HTTPS, RSS, etc.

FIG. 1 is an illustration of a system for utilizing real-time data for predictive analysis of the performance of a monitored system, in accordance with one embodiment. As shown herein, the system 100 includes a series of sensors, i.e., Sensor A 104, Sensor B 106, Sensor C 108, interfaced with the various components of a monitored system 102, a data acquisition hub 112, an analytics server 116, and a thin-client device 128. In one embodiment, the monitored system 102 is an electrical power generation plant. In another embodiment, the monitored system 102 is an electrical power transmission infrastructure. In still another embodiment, the monitored system 102 is an electrical power distribution system. In still another embodiment, the monitored system 102 includes a combination of one or more electrical power generation plant(s), power transmission infrastructure(s), and/or an electrical power distribution system. It should be understood that the monitored system 102 can be any combination of components whose operations can be monitored with conventional sensors and where each component interacts with or is related to at least one other component within the combination. For a monitored system 102 that is an electrical power generation, transmission, or distribution system, the sensors can provide data such as voltage, frequency, current, power, power factor, and the like. In an embodiment, the monitored system 102 is a microgrid system. The microgrid system can comprise electrical power generation components as well as electrical power distribution elements. The microgrid system can also be interfaced with the macrogrid. The microgrid can be monitored for excess capacity that can be used to generate electricity that can be sold over the public grid and/or for utilization that requires electricity to be purchased off of the macrogrid.

The sensors 104, 106 and 108 can be configured to provide output values for system parameters that indicate the operational status and/or "health" of the monitored system 102. For example, in an electrical power generation system, the current output or voltage readings for the various components that comprise the power generation system is indicative of the overall health and/or operational condition of the system. In one embodiment, the sensors are configured to also measure additional data that can affect system operation. For example, for an electrical power distribution system, the sensor output can include environmental information, e.g., temperature, humidity, etc., which can impact electrical power demand and can also affect the operation and efficiency of the power distribution system itself.

Continuing with FIG. 1, in one embodiment, the sensors 104, 106 and 108 can be configured to output data in an analog format. For example, electrical power sensor measurements, e.g., voltage, current, etc., are sometimes conveyed in an analog format as the measurements may be continuous in both time and amplitude. In another embodiment, the sensors 104, 106 and 108 can be configured to output data in a digital format. For example, the same electrical power sensor measurements can be taken in discrete time increments that are not continuous in time or amplitude. In still another embodiment, the sensors 104, 106 and 108 can be configured to output data in either an analog format, digital format, or both, depending on the sampling requirements of the monitored system 102.

The sensors 104, 106 and 108 can be configured to capture output data at split-second intervals to effectuate "real time" data capture. For example, in one embodiment, the sensors 104, 106 and 108 can be configured to generate hundreds of thousands of data readings per second. It should be appreciated, however, that the number of data output readings taken by a particular sensor can be set to any value as long as the operational limits of the sensor and the data processing capabilities of the data acquisition hub 112 are not exceeded.

Still referring to FIG. 1, each sensor 104, 106 and 108 can be communicatively connected to the data acquisition hub 112 via an analog or digital data connection 110. The data acquisition hub 112 can be a standalone unit or integrated within the analytics server 116 and can be embodied as a piece of hardware, software, or some combination thereof. In one embodiment, the data connection 110 is a "hard wired" physical data connection, e.g., serial, network, etc. For example, a serial or parallel cable connection between the sensor and the hub 112. In another embodiment, the data connection 110 is a wireless data connection. For example, a radio frequency (RF), BLUETOOTH™, infrared or equivalent connection between the sensor and the hub 112.

The data acquisition hub 112 can be configured to communicate "real-time" data from the monitored system 102 to the analytics server 116 using a network connection 114. In one embodiment, the network connection 114 is a "hardwired" physical connection. For example, the data acquisition hub 112 can be communicatively connected, e.g., via Category 5 (CAT5), fiber optic, or equivalent cabling, to a data server (not shown) that is communicatively connected, e.g., via CAT5, fiber optic, or equivalent cabling, through the Internet and to the analytics server 116 server. The analytics server 116 can also be communicatively connected with the Internet, e.g., via CAT5, fiber optic, or equivalent cabling. In another embodiment, the network connection 114 can be a wireless network connection, e.g., Wi-Fi, WLAN, etc. For example, utilizing an 802.11b/g or equivalent transmission format. In practice, the network connection used is dependent upon the particular requirements of the monitored system 102.

Data acquisition hub 112 can also be configured to supply warning and alarms signals as well as control signals to monitored system 102 and/or sensors 104, 106, and 108 as described in more detail below.

As shown in FIG. 1, in one embodiment, the analytics server 116 can host an analytics engine 118, virtual system modeling engine 124, and several databases 126, 130, and 132. The virtual system modeling engine 124 can, e.g., be a computer modeling system, such as described above. In this context, however, the modeling engine 124 can be used to precisely model and mirror the actual electrical system. Analytics engine 118 can be configured to generate predicted data for the monitored system and analyze difference between the predicted data and the real-time data received from hub 112. In an embodiment, if the monitored system is a microgrid, the predicted data can include predictions on capacity and utilization. These predictions can be used to project whether the microgrid operations may meet the objectives of the microgrid operator, such as minimizing the annual cost of operations, minimizing the carbon footprint of the microgrid system, minimizing the peak load on the microgrid, minimizing public utility consumption, or a combination thereof. The microgrid operator can define a set of operational objectives. For example, a microgrid operator could define an objective that requires that utility power from the macrogrid only be used during off-peak hours in order to reduce operational costs, unless system reliability falls below 99.99%, a which time utility power can be used to ensure that the system reliability objectives are met.

Figure 2:
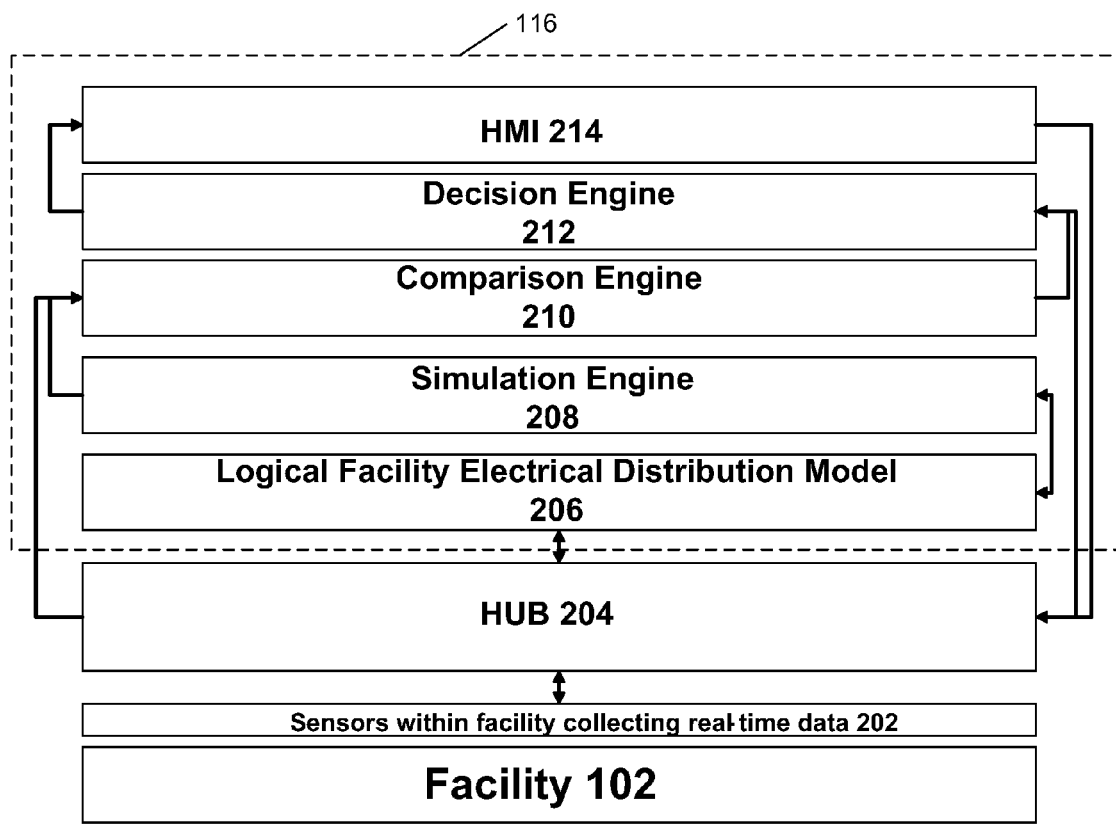
FIG. 2 is a diagram illustrating a detailed view of an analytics server included in the system of FIG. 1.

FIG. 2 is a diagram illustrating a more detailed view of analytic server 116. As can be seen, analytic server 116 is interfaced with a monitored facility 102 via sensors 202, e.g., sensors 104, 106, and 108. Sensors 202 are configured to supply real-time data from within monitored facility 102. The real-time data is communicated to analytic server 116 via a hub 204. Hub 204 can be configured to provide real-time data to server 116 as well as alarming, sensing, and control features for facility 102.

The real-time data from hub 204 can be passed to a comparison engine 210, which can form part of analytics engine 118. Comparison engine 210 can be configured to continuously compare the real-time data with predicted values generated by simulation engine 208. Based on the comparison, comparison engine 210 can be further configured to determine whether deviations between the real-time and the expected values exists, and if so to classify the deviation, e.g., high, marginal, low, etc. The deviation level can then be communicated to decision engine 212, which can also comprise part of analytics engine 118.

Decision engine 212 can be configured to look for significant deviations between the predicted values and real-time values as received from the comparison engine 210. If significant deviations are detected, decision engine 212 can also be configured to determine whether an alarm condition exists, activate the alarm and communicate the alarm to Human-Machine Interface (HMI) 214 for display in real-time via, e.g., thin client 128. Decision engine 212 can also be configured to perform root cause analysis for significant deviations in order to determine the interdependencies and identify the parent-child failure relationships that may be occurring. In this manner, parent alarm conditions are not drowned out by multiple children alarm conditions, allowing the user/operator to focus on the main problem, at least at first.

Thus, in one embodiment, and alarm condition for the parent can be displayed via HMI 214 along with an indication that processes and equipment dependent on the parent process or equipment are also in alarm condition. This also means that server 116 can maintain a parent-child logical relationship between processes and equipment comprising facility 102. Further, the processes can be classified as critical, essential, non-essential, etc.

Decision engine 212 can also be configured to determine health and performance levels and indicate these levels for the various processes and equipment via HMI 214. All of which, when combined with the analytic capabilities of analytics engine 118 allows the operator to minimize the risk of catastrophic equipment failure by predicting future failures and providing prompt, informative information concerning potential/predicted failures before they occur. Avoiding catastrophic failures reduces risk and cost, and maximizes facility performance and up time.

Simulation engine 208 operates on complex logical models 206 of facility 102. These models are continuously and automatically synchronized with the actual facility status based on the real-time data provided by hub 204. In other words, the models are updated based on current switch status, breaker status, e.g., open-closed, equipment on/off status, etc. Thus, the models are automatically updated based on such status, which allows simulation engine to produce predicted data based on the current facility status. This in turn, allows accurate and meaningful comparisons of the real-time data to the predicted data.

Example models 206 that can be maintained and used by server 116 include power flow models used to calculate expected kW, kVAR, power factor values, etc., short circuit models used to calculate maximum and minimum available fault currents, protection models used to determine proper protection schemes and ensure selective coordination of protective devices, power quality models used to determine voltage and current distortions at any point in the network, to name just a few. It will be understood that different models can be used depending on the system being modeled.

In certain embodiments, hub 204 is configured to supply equipment identification associated with the real-time data. This identification can be cross referenced with identifications provided in the models.

In one embodiment, if the comparison performed by comparison engine 210 indicates that the differential between the real-time sensor output value and the expected value exceeds a Defined Difference Tolerance (DDT) value, i.e., the "real-time" output values of the sensor output do not indicate an alarm condition, but below an alarm condition, i.e., alarm threshold value, a calibration request is generated by the analytics engine 118. If the differential exceeds the alarm condition, an alarm or notification message can be generated by the analytics engine 118. If the differential is below the DTT value, the analytics engine can do nothing and continues to monitor the real-time data and expected data.

In one embodiment, the alarm or notification message can be sent directly to the client or user) 128, e.g., via HMI 214, for display in real-time on a web browser, pop-up message box, e-mail, or equivalent on the client 128 display panel. In another embodiment, the alarm or notification message can be sent to a wireless mobile device, e.g., BLACKBERRY™, laptop, pager, etc., to be displayed for the user by way of a wireless router or equivalent device interfaced with the analytics server 116. In still another embodiment, the alarm or notification message can be sent to both the client 128 display and the wireless mobile device. The alarm can be indicative of a need for a repair event or maintenance to be done on the monitored system. It should be noted, however, that calibration requests should not be allowed if an alarm condition exists to prevent the models from being calibrated to an abnormal state.

Once the calibration is generated by the analytics engine 118, the various operating parameters or conditions of model(s) 206 can be updated or adjusted to reflect the actual facility configuration. This can include, but is not limited to, modifying the predicted data output from the simulation engine 208, adjusting the logic/processing parameters used by the model(s) 206, adding/subtracting functional elements from model(s) 206, etc. It should be understood that any operational parameter used by models 206 can be modified as long as the resulting modifications can be processed and registered by simulation engine 208.

Referring back to FIG. 1, models 206 can be stored in the virtual system model database 126. As noted, a variety of conventional virtual model applications can be used for creating a virtual system model, so that a wide variety of systems and system parameters can be modeled. For example, in the context of an electrical power distribution system, the virtual system model can include components for modeling reliability, modeling voltage stability, and modeling power flow. In addition, models 206 can include dynamic control logic that permits a user to configure the models 206 by specifying control algorithms and logic blocks in addition to combinations and interconnections of generators, governors, relays, breakers, transmission line, and the like. The voltage stability parameters can indicate capacity in terms of size, supply, and distribution, and can indicate availability in terms of remaining capacity of the presently configured system. The power flow model can specify voltage, frequency, and power factor, thus representing the "health" of the system.

All of models 206 can be referred to as a virtual system model. Thus, a virtual system model database 130 can be configured to store the virtual system model. A duplicate, but synchronized copy of the virtual system model can be stored in a virtual simulation model database 130. This duplicate model can be used for what-if simulations. In other words, this model can be used to allow a system designer to make hypothetical changes to the facility and test the resulting effect, without taking down the facility or costly and time consuming analysis. Such hypothetical can be used to learn failure patterns and signatures as well as to test proposed modifications, upgrades, additions, etc., for the facility. The real-time data, as well as trending produced by analytics engine 118 can be stored in a real-time data acquisition database 132.

As discussed above, the virtual system model is periodically calibrated and synchronized with "real-time" sensor data outputs so that the virtual system model provides data output values that are consistent with the actual "real-time" values received from the sensor output signals. Unlike conventional systems that use virtual system models primarily for system design and implementation purposes, i.e., offline simulation and facility planning, the virtual system models described herein are updated and calibrated with the real-time system operational data to provide better predictive output values. A divergence between the real-time sensor output values and the predicted output values generate either an alarm condition for the values in question and/or a calibration request that is sent to the calibration engine 134.

Continuing with FIG. 1, the analytics engine 118 can be configured to implement pattern/sequence recognition into a real-time decision loop that, e.g., is enabled by a new type of machine learning called associative memory, or hierarchical temporal memory (HTM), which is a biological approach to learning and pattern recognition. Associative memory allows storage, discovery, and retrieval of learned associations between extremely large numbers of attributes in real time. At a basic level, an associative memory stores information about how attributes and their respective features occur together. The predictive power of the associative memory technology comes from its ability to interpret and analyze these co-occurrences and to produce various metrics. Associative memory is built through "experiential" learning in which each newly observed state is accumulated in the associative memory as a basis for interpreting future events. Thus, by observing normal system operation over time, and the normal predicted system operation over time, the associative memory is able to learn normal patterns as a basis for identifying non-normal behavior and appropriate responses, and to associate patterns with particular outcomes, contexts or responses. The analytics engine 118 is also better able to understand component mean time to failure rates through observation and system availability characteristics. This technology in combination with the virtual system model can be characterized as a "neocortical" model of the system under management This approach also presents a novel way to digest and comprehend alarms in a manageable and coherent way. The neocortical model could assist in uncovering the patterns and sequencing of alarms to help pinpoint the location of the (impending) failure, its context, and even the cause. Typically, responding to the alarms is done manually by experts who have gained familiarity with the system through years of experience. However, at times, the amount of information is so great that an individual cannot respond fast enough or does not have the necessary expertise. An "intelligent" system like the neocortical system that observes and recommends possible responses could improve the alarm management process by either supporting the existing operator, or even managing the system autonomously.

Current simulation approaches for maintaining transient stability involve traditional numerical techniques and typically do not test all possible scenarios. The problem is further complicated as the numbers of components and pathways increase. Through the application of the neocortical model, by observing simulations of circuits, and by comparing them to actual system responses, it may be possible to improve the simulation process, thereby improving the overall design of future circuits.

The virtual system model database 126, as well as databases 130 and 132, can be configured to store one or more virtual system models, virtual simulation models, and real-time data values, each customized to a particular system being monitored by the analytics server 118. Thus, the analytics server 118 can be used to monitor more than one system at a time. As depicted herein, the databases 126, 130, and 132 can be hosted on the analytics server 116 and communicatively interfaced with the analytics engine 118. In other embodiments, databases 126, 130, and 132 can be hosted on a separate database server (not shown) that is communicatively connected to the analytics server 116 in a manner that allows the virtual system modeling engine 124 and analytics engine 118 to access the databases as needed.

Therefore, in one embodiment, the client 128 can modify the virtual system model stored on the virtual system model database 126 by using a virtual system model development interface using well-known modeling tools that are separate from the other network interfaces. For example, dedicated software applications that run in conjunction with the network interface to allow a client 128 to create or modify the virtual system models.

The client 128 can use a variety of network interfaces, e.g., web browser, CITRIX™, WINDOWS TERMINAL SERVICES™, telnet, or other equivalent thin-client terminal applications, etc., to access, configure, and modify the sensors, e.g., configuration files, etc., analytics engine 118, e.g., configuration files, analytics logic, etc., calibration parameters, e.g., configuration files, calibration parameters, etc., virtual system modeling engine 124, e.g., configuration files, simulation parameters, etc., and virtual system model of the system under management, e.g., virtual system model operating parameters and configuration files. Correspondingly, data from those various components of the monitored system 102 can be displayed on a client 128 display panel for viewing by a system administrator or equivalent.

Figure 3:
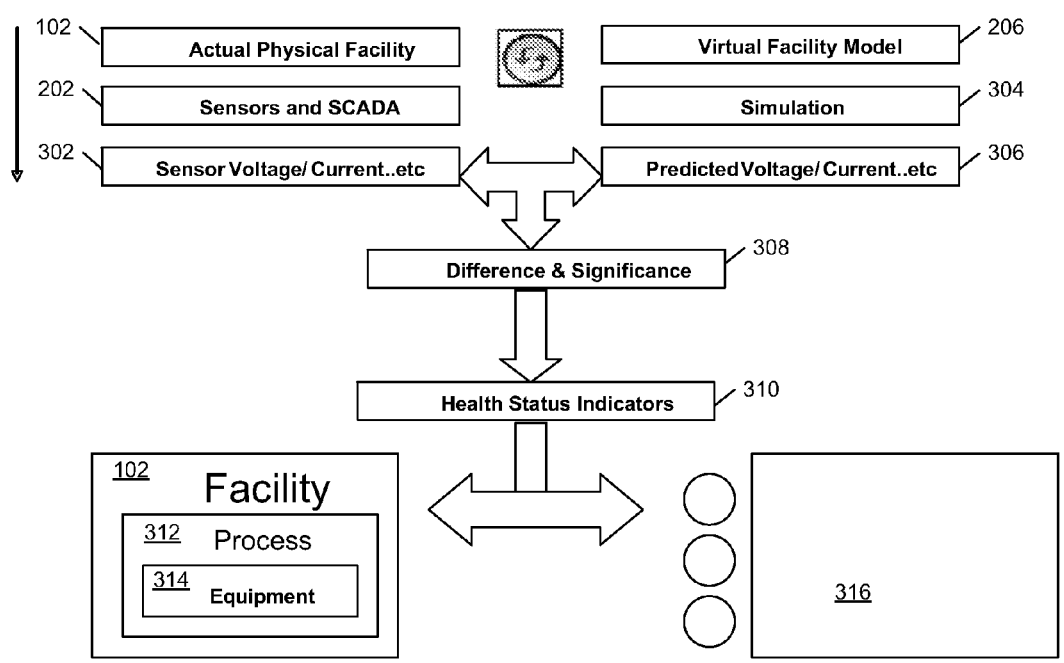
FIG. 3 is a diagram illustrating how the system of FIG. 1 operates to synchronize the operating parameters between a physical facility and a virtual system model of the facility.

As described above, server 116 is configured to synchronize the physical world with the virtual and report, e.g., via visual, real-time display, deviations between the two as well as system health, alarm conditions, predicted failures, etc. This is illustrated with the aid of FIG. 3, in which the synchronization of the physical world (left side) and virtual world (right side) is illustrated. In the physical world, sensors 202 produce real-time data 302 for the processes 312 and equipment 314 that make up facility 102. In the virtual world, simulations 304 of the virtual system model 206 provide predicted values 306, which are correlated and synchronized with the real-time data 302. The real-time data can then be compared to the predicted values so that differences 308 can be detected. The significance of these differences can be determined to determine the health status 310 of the system. The health stats can then be communicated to the processes 312 and equipment 314, e.g., via alarms and indicators, as well as to thin client 128, e.g., via web pages 316.

Figure 4:
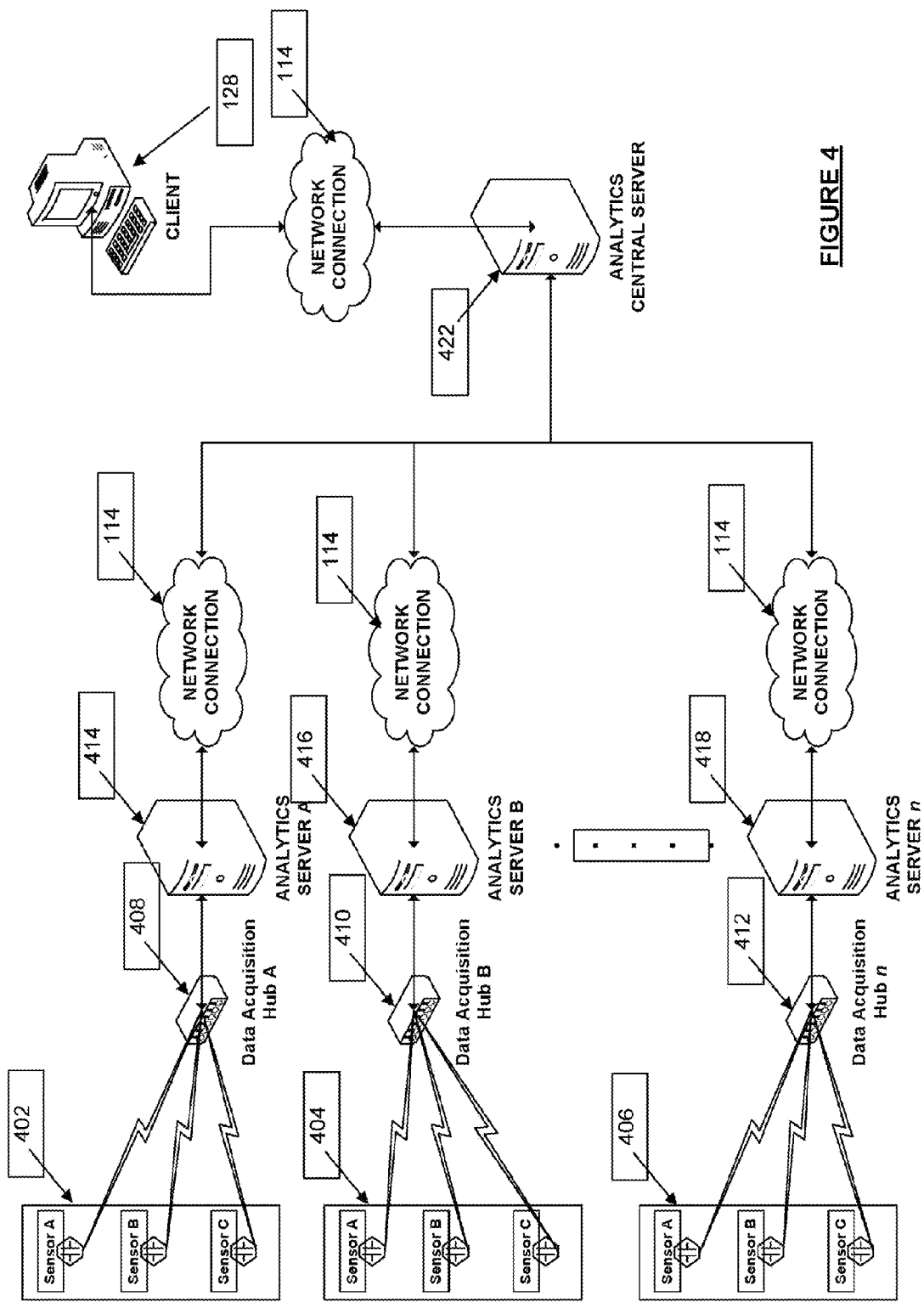
FIG. 4 is an illustration of the scalability of a system for utilizing real-time data for predictive analysis of the performance of a monitored system, in accordance with one embodiment.

FIG. 4 is an illustration of the scalability of a system for utilizing real-time data for predictive analysis of the performance of a monitored system, in accordance with one embodiment. As depicted herein, an analytics central server 422 is communicatively connected with analytics server A 414, analytics server B 416, and analytics server n 418, i.e., one or more other analytics servers, by way of one or more network connections 114. Each of the analytics servers 414, 416, and 418 is communicatively connected with a respective data acquisition hub, i.e., Hub A 408, Hub B 410, Hub n 412, which communicates with one or more sensors that are interfaced with a system, i.e., Monitored System A 402, Monitored System B 404, Monitored System n 406, which the respective analytical server monitors. For example, analytics server A 414 is communicative connected with data acquisition hub A 408, which communicates with one or more sensors interfaced with monitored system A 402. According to an embodiment, the Monitored System A 402, Monitored System B 404, Monitored System n 406 can be distributed generation systems, such as microgrid systems. In an embodiment, multiple distributed energy generation systems might be used by a microgrid system. For example, a university campus might include multiple distributed energy generation sources, such as solar panel arrays, wind turbines, and other on-premise power generation systems. Each of the distributed energy solutions could be treated as a separate monitored system that are managed via the analytics central server 422.

Each analytics server, i.e., analytics server A 414, analytics server B 416, analytics server n 418, can be configured to monitor the sensor output data of its corresponding monitored system and feed that data to the central analytics server 422. Additionally, each of the analytics servers 414, 416 and 418 can function as a proxy agent of the central analytics server 422 during the modifying and/or adjusting of the operating parameters of the system sensors they monitor. For example, analytics server B 416 can be configured as a proxy to modify the operating parameters of the sensors interfaced with monitored system B 404.

Moreover, the central analytics server 422, which is communicatively connected to one or more analytics server(s), can be used to enhance the scalability. For example, a central analytics server 422 can be used to monitor multiple electrical power generation facilities, i.e., monitored system A 402 can be a power generation facility located in city A while monitored system B 404 is a power generation facility located in city B, on an electrical power grid. In this example, the number of electrical power generation facilities that can be monitored by central analytics server 422 is limited only by the data processing capacity of the central analytics server 422. As described above, central analytics server 422 can be used to monitor multiple distributed electrical power generation facilities that are part of a microgrid.

The central analytics server 422 can be configured to enable a client 128 to modify and adjust the operational parameters of any the analytics servers communicatively connected to the central analytics server 422. Furthermore, as discussed above, each of the analytics servers 414, 416 and 418 can be configured to serve as proxies for the central analytics server 422 to enable a client 128 to modify and/or adjust the operating parameters of the sensors interfaced with the systems that they respectively monitor. For example, the client 128 can use the central analytics server 422, and vice versa, to modify and/or adjust the operating parameters of analytics server A 414 and use the same to modify and/or adjust the operating parameters of the sensors interfaced with monitored system A 402. Additionally, each of the analytics servers can be configured to allow a client 128 to modify the virtual system model through a virtual system model development interface using well-known modeling tools.

In one embodiment, the central analytics server 422 can function to monitor and control a monitored system when its corresponding analytics server is out of operation. For example, central analytics server 422 can take over the functionality of analytics server B 416 when the server 416 is out of operation. That is, the central analytics server 422 can monitor the data output from monitored system B 404 and modify and/or adjust the operating parameters of the sensors that are interfaced with the system 404.

In one embodiment, the network connection 114 is established through a wide area network (WAN) such as the Internet. In another embodiment, the network connection is established through a local area network (LAN) such as the company intranet. In a separate embodiment, the network connection 114 is a "hardwired" physical connection. For example, the data acquisition hub 112 can be communicatively connected, e.g., via Category 5 (CAT5), fiber optic, or equivalent cabling, to a data server that is communicatively connected, e.g., via CAT5, fiber optic, or equivalent cabling, through the Internet and to the analytics server 116 server hosting the analytics engine 118. In another embodiment, the network connection 114 is a wireless network connection, e.g., Wi-Fi, WLAN, etc. For example, utilizing an 802.11b/g or equivalent transmission format.

In certain embodiments, regional analytics servers can be placed between local analytics servers 414, 416, 418 and central analytics server 422. Further, in certain embodiments a disaster recovery site can be included at the central analytics server 422 level.

Figure 5:
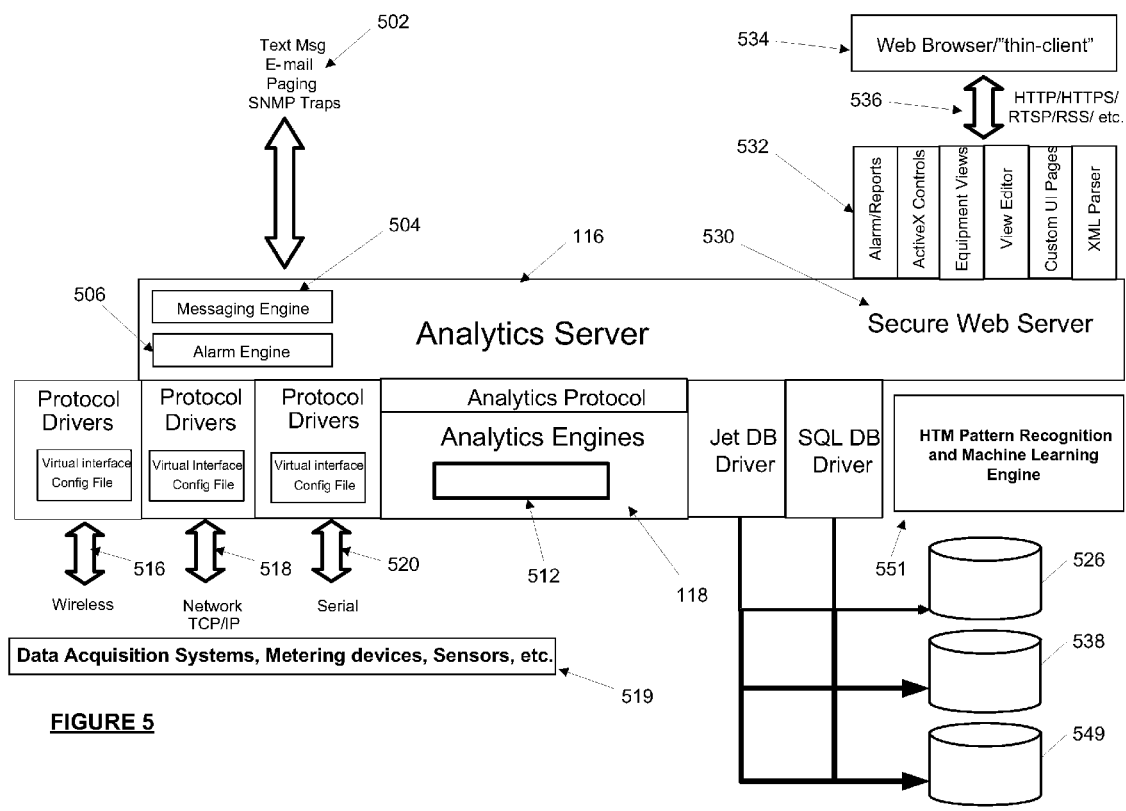
FIG. 5 is a block diagram that shows the configuration details of the system illustrated in FIG. 1, in accordance with one embodiment.

FIG. 5 is a block diagram that shows the configuration details of analytics server 116 illustrated in FIG. 1 in more detail. It should be understood that the configuration details in FIG. 5 are merely one embodiment of the items described for FIG. 1, and it should be understood that alternate configurations and arrangements of components could also provide the functionality described herein.

The analytics server 116 includes a variety of components. In the example of FIG. 5, the analytics server 116 is implemented in a Web-based configuration, so that the analytics server 116 includes, or communicates with, a secure web server 530 for communication with the sensor systems 519, e.g., data acquisition units, metering devices, sensors, etc., and external communication entities 534, e.g., web browser, "thin client" applications, etc. A variety of user views and functions 532 are available to the client 128 such as: alarm reports, Active X controls, equipment views, view editor tool, custom user interface page, and XML parser. It should be appreciated, however, that these are just examples of a few in a long list of views and functions 532 that the analytics server 116 can deliver to the external communications entities 534 and are not meant to limit the types of views and functions 532 available to the analytics server 116 in any way.

The analytics server 116 also includes an alarm engine 506 and messaging engine 504, for the aforementioned external communications. The alarm engine 506 is configured to work in conjunction with the messaging engine 504 to generate alarm or notification messages 502, in the form of text messages, e-mails, paging, etc., in response to the alarm conditions previously described. The analytics server 116 determines alarm conditions based on output data it receives from the various sensor systems 519 through a communications connection, e.g., wireless 516, TCP/IP 518, Serial 520, etc., and simulated output data from a virtual system model 512, of the monitored system, processed by the analytics engines 118. In one embodiment, the virtual system model 512 can be created by a user through interacting with an external communication entity 534 by specifying the components that comprise the monitored system and by specifying relationships between the components of the monitored system. In another embodiment, the virtual system model 512 can be automatically generated by the analytics engines 118 as components of the monitored system are brought online and interfaced with the analytics server 508.

Continuing with FIG. 5, a virtual system model database 526 can be communicatively connected with the analytics server 116 and can be configured to store one or more virtual system models 512, each of which represents a particular monitored system. For example, the analytics server 116 can conceivably monitor multiple electrical power generation systems, e.g., system A, system B, system C, etc., spread across a wide geographic area, e.g., City A, City B, City C, etc. Therefore, the analytics server 116 can use a different virtual system model 512 for each of the electrical power generation systems that it monitors. Virtual simulation model database 538 can be configured to store a synchronized, duplicate copy of the virtual system model 512, and real-time data acquisition database 540 can store the real-time and trending data for the system(s) being monitored.

Thus, in operation, analytics server 116 can receive real-time data for various sensors, i.e., components, through data acquisition system 202. As can be seen, analytics server 116 can comprise various drivers configured to interface with the various types of sensors, etc., comprising data acquisition system 202. This data represents the real-time operational data for the various components. For example, the data can indicate that a certain component is operating at a certain voltage level and drawing certain amount of current. This information can then be fed to a modeling engine to generate a virtual system model 512 that is based on the actual real-time operational data.

Analytics engine 118 can be configured to compare predicted data based on the virtual system model 512 with real-time data received from data acquisition system 202 and to identify any differences. In some instances, analytics engine can be configured to identify these differences and then update, i.e., calibrate, the virtual system model 512 for use in future comparisons. In this manner, more accurate comparisons and warnings can be generated.

But in other instances, the differences will indicate a failure, or the potential for a failure. For example, when a component begins to fail, the operating parameters will begin to change. This change may be sudden or it may be a progressive change over time. Analytics engine 118 can detect such changes and issue warnings that can allow the changes to be detected before a failure occurs. The analytic engine 118 can be configured to generate warnings that can be communicated via interface 532.

For example, a user can access information from server 116 using thin client 534. For example, reports can be generate and served to thin client 534 via server 540. These reports can, for example, comprise schematic or symbolic illustrations of the system being monitored. Status information for each component can be illustrated or communicated for each component. This information can be numerical, i.e., the voltage or current level, or it can be symbolic, i.e., green for normal, red for failure or warning. In certain embodiments, intermediate levels of failure can also be communicated, i.e., yellow can be used to indicate operational conditions that project the potential for future failure. It should be noted that this information can be accessed in real-time. Moreover, via thin client 534, the information can be accessed from anywhere and anytime.

Continuing with FIG. 5, the Analytics Engine 118 is communicatively interfaced with a HTM pattern recognition and machine learning engine 551. The HTM engine 551 can be configured to work in conjunction with the analytics engine 118 and a virtual system model of the monitored system to make real-time predictions, i.e., forecasts, about various operational aspects of the monitored system. The HTM engine 551 works by processing and storing patterns observed during the normal operation of the monitored system over time. These observations are provided in the form of real-time data captured using a multitude of sensors that are imbedded within the monitored system. In one embodiment, the virtual system model can also be updated with the real-time data such that the virtual system model "ages" along with the monitored system. Examples of a monitored system can include machinery, factories, electrical systems, processing plants, devices, chemical processes, biological systems, data centers, aircraft carriers, and the like. It should be understood that the monitored system can be any combination of components whose operations can be monitored with conventional sensors and where each component interacts with or is related to at least one other component within the combination.

Figure 6:
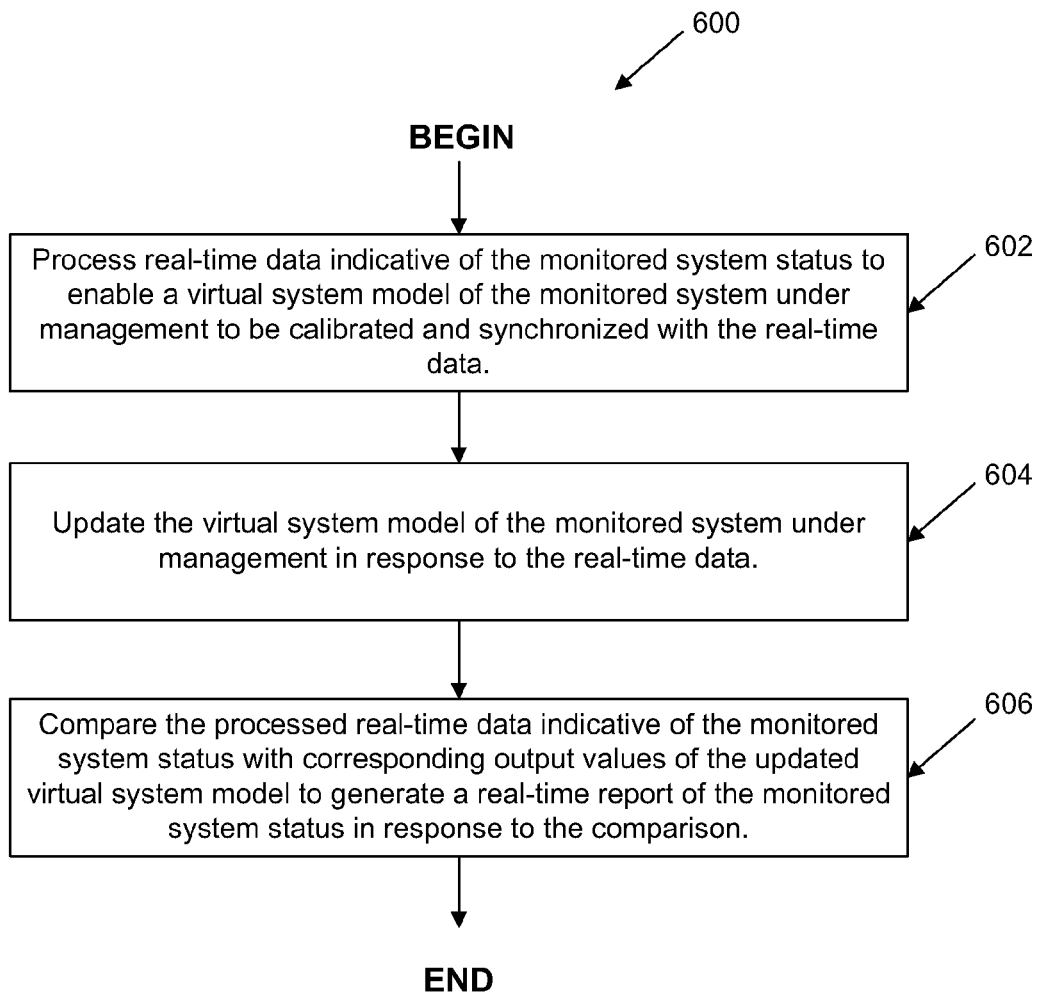
FIG. 6 is an illustration of a flowchart describing a method for real-time monitoring and predictive analysis of a monitored system, in accordance with one embodiment.

FIG. 6 is a flowchart describing a method for real-time monitoring and predictive analysis of a monitored system, in accordance with one embodiment. Method 600 begins with operation 602 where real-time data indicative of the monitored system status is processed to enable a virtual model of the monitored system under management to be calibrated and synchronized with the real-time data. In one embodiment, the monitored system 102 is a mission critical electrical power system. In another embodiment, the monitored system 102 can include an electrical power transmission infrastructure. In still another embodiment, the monitored system 102 includes a combination of thereof. It should be understood that the monitored system 102 can be any combination of components whose operations can be monitored with conventional sensors and where each component interacts with or is related to at least one other component within the combination.

Method 600 moves on to operation 604 where the virtual system model of the monitored system under management is updated in response to the real-time data. This may include, but is not limited to, modifying the simulated data output from the virtual system model, adjusting the logic/processing parameters utilized by the virtual system modeling engine to simulate the operation of the monitored system, adding/subtracting functional elements of the virtual system model, etc. It should be understood, that any operational parameter of the virtual system modeling engine and/or the virtual system model may be modified by the calibration engine as long as the resulting modifications can be processed and registered by the virtual system modeling engine.

Method 600 proceeds on to operation 606 where the simulated real-time data indicative of the monitored system status is compared with a corresponding virtual system model created at the design stage. The design stage models, which may be calibrated and updated based on real-time monitored data, are used as a basis for the predicted performance of the system. The real-time monitored data can then provide the actual performance over time. By comparing the real-time data with the predicted performance information, difference can be identified a tracked by, e.g., the analytics engine 118. Analytics engines 118 can then track trends, determine alarm states, etc., and generate a real-time report of the system status in response to the comparison.

In other words, the analytics can be used to analyze the comparison and real-time data and determine if there is a problem that should be reported and what level the problem may be, e.g., low priority, high priority, critical, etc. The analytics can also be used to predict future failures and time to failure, etc. In one embodiment, reports can be displayed on a conventional web browser (e.g. INTERNET EXPLORER™, FIREFOX™, NETSCAPE™, etc., which can be rendered on a standard personal computing (PC) device. In another embodiment, the "real-time" report can be rendered on a "thin-client" computing device, e.g., CITRIX™, WINDOWS TERMINAL SERVICES™, telnet, or other equivalent thin-client terminal application. In still another embodiment, the report can be displayed on a wireless mobile device, e.g., BLACKBERRY™, laptop, pager, etc. For example, in one embodiment, the "real-time" report can include such information as the differential in a particular power parameter, i.e., current, voltage, etc., between the real-time measurements and the virtual output data.

Figure 7:
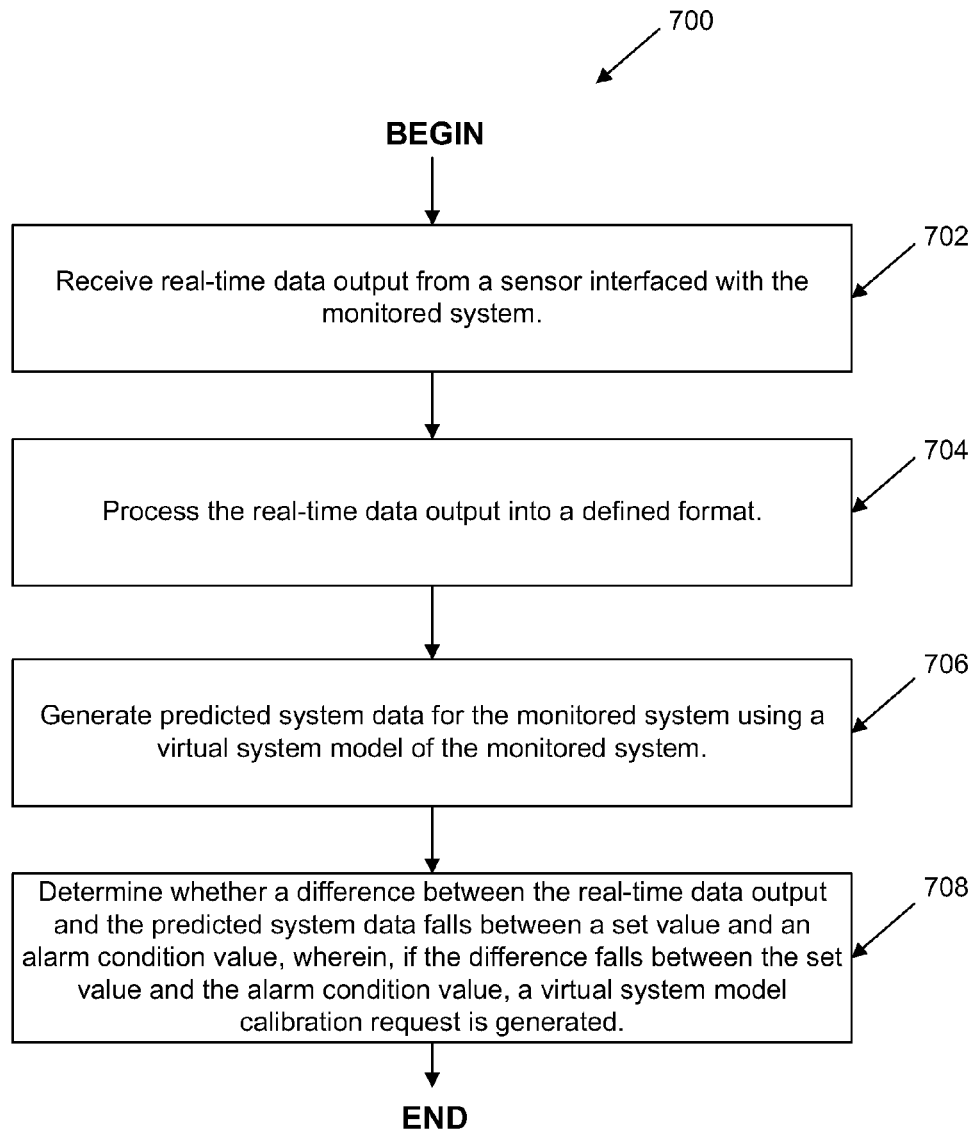
FIG. 7 is an illustration of a flowchart describing a method for managing real-time updates to a virtual system model of a monitored system, in accordance with one embodiment.

FIG. 7 is a flowchart describing a method for managing real-time updates to a virtual system model of a monitored system, in accordance with one embodiment. Method 700 begins with operation 702 where real-time data output from a sensor interfaced with the monitored system is received. The sensor is configured to capture output data at split-second intervals to effectuate "real time" data capture. For example, in one embodiment, the sensor is configured to generate hundreds of thousands of data readings per second. It should be appreciated, however, that the number of data output readings taken by the sensor may be set to any value as long as the operational limits of the sensor and the data processing capabilities of the data acquisition hub are not exceeded.

Method 700 moves to operation 704 where the real-time data is processed into a defined format. This would be a format that can be used by the analytics server to analyze or compare the data with the simulated data output from the virtual system model. In one embodiment, the data is converted from an analog signal to a digital signal. In another embodiment, the data is converted from a digital signal to an analog signal. It should be understood, however, that the real-time data may be processed into any defined format as long as the analytics engine can utilize the resulting data in a comparison with simulated output data from a virtual system model of the monitored system.

Method 700 continues on to operation 706 where the predicted, i.e., simulated, data for the monitored system is generated using a virtual system model of the monitored system. As discussed above, a virtual system modeling engine uses dynamic control logic stored in the virtual system model to generate the predicted output data. The predicted data is supposed to be representative of data that should actually be generated and output from the monitored system.

Method 700 proceeds to operation 708 where a determination is made as to whether the difference between the real-time data output and the predicted system data falls between a set value and an alarm condition value, where if the difference falls between the set value and the alarm condition value a virtual system model calibration and a response can be generated. That is, if the comparison indicates that the differential between the "real-time" sensor output value and the corresponding "virtual" model data output value exceeds a Defined Difference Tolerance (DDT) value, i.e., the "real-time" output values of the sensor output do not indicate an alarm condition, but below an alarm condition, i.e., alarm threshold value, a response can be generated by the analytics engine. In one embodiment, if the differential exceeds the alarm condition, an alarm or notification message is generated by the analytics engine 118. In another embodiment, if the differential is below the DTT value, the analytics engine does nothing and continues to monitor the "real-time" data and "virtual" data. Generally speaking, the comparison of the set value and alarm condition is indicative of the functionality of one or more components of the monitored system.

Figure 8:
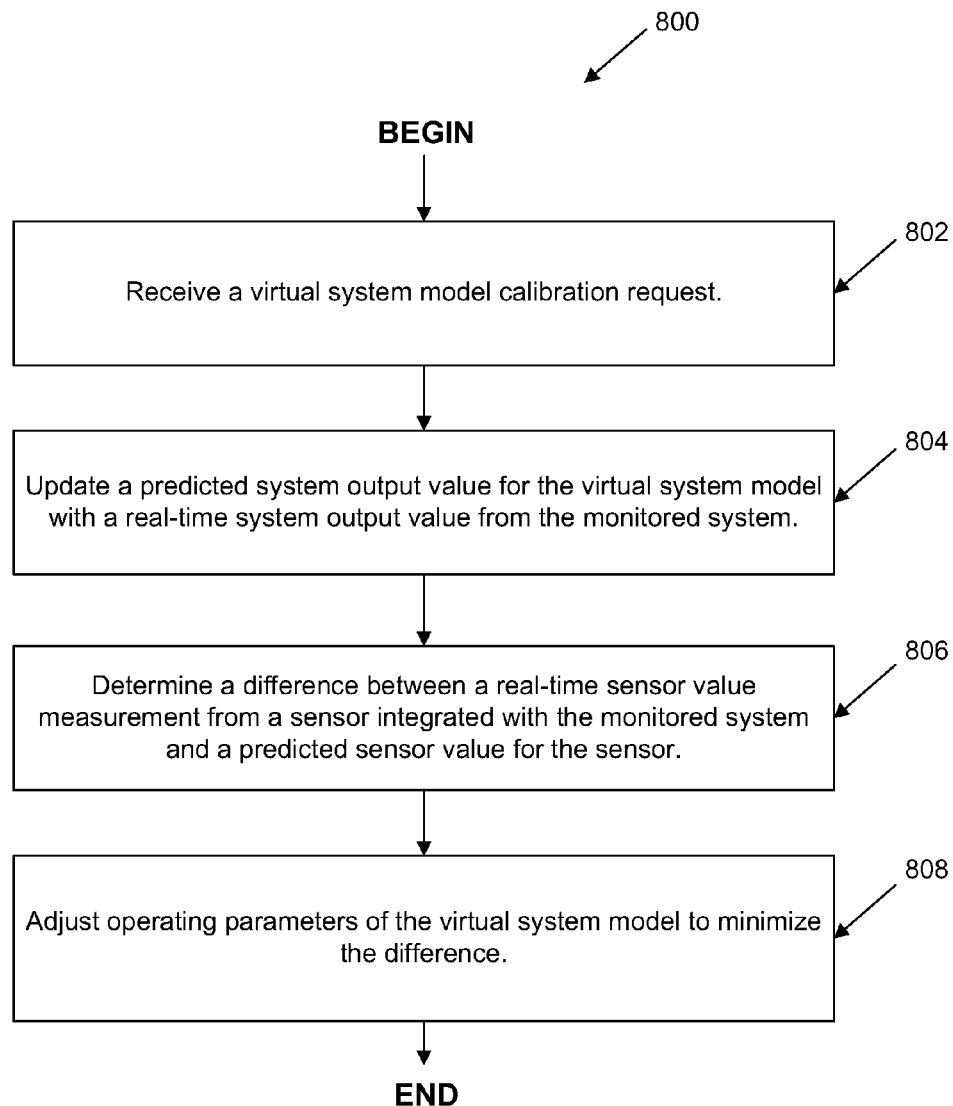
FIG. 8 is an illustration of a flowchart describing a method for synchronizing real-time system data with a virtual system model of a monitored system, in accordance with one embodiment.

FIG. 8 is a flowchart describing a method for synchronizing real-time system data with a virtual system model of a monitored system, in accordance with one embodiment. Method 800 begins with operation 802 where a virtual system model calibration request is received. A virtual model calibration request can be generated by an analytics engine whenever the difference between the real-time data output and the predicted system data falls between a set value and an alarm condition value.

Method 800 proceeds to operation 804 where the predicted system output value for the virtual system model is updated with a real-time output value for the monitored system. For example, if sensors interfaced with the monitored system outputs a real-time current value of A, then the predicted system output value for the virtual system model is adjusted to reflect a predicted current value of A.

Method 800 moves on to operation 806 where a difference between the real-time sensor value measurement from a sensor integrated with the monitored system and a predicted sensor value for the sensor is determined. As discussed above, the analytics engine is configured to receive "real-time" data from sensors interfaced with the monitored system via the data acquisition hub, or, alternatively directly from the sensors, and "virtual" data from the virtual system modeling engine simulating the data output from a virtual system model of the monitored system. In one embodiment, the values are in units of electrical power output, i.e., current or voltage, from an electrical power generation or transmission system. It should be appreciated, however, that the values can essentially be any unit type as long as the sensors can be configured to output data in those units or the analytics engine can convert the output data received from the sensors into the desired unit type before performing the comparison.

Method 800 continues on to operation 808 where the operating parameters of the virtual system model are adjusted to minimize the difference. This means that the logic parameters of the virtual system model that a virtual system modeling engine uses to simulate the data output from actual sensors interfaced with the monitored system are adjusted so that the difference between the real-time data output and the simulated data output is minimized. Correspondingly, this operation will update and adjust any virtual system model output parameters that are functions of the virtual system model sensor values. For example, in a power distribution environment, output parameters of power load or demand factor might be a function of multiple sensor data values. The operating parameters of the virtual system model that mimic the operation of the sensor will be adjusted to reflect the real-time data received from those sensors. In one embodiment, authorization from a system administrator is requested prior to the operating parameters of the virtual system model being adjusted. This is to ensure that the system administrator is aware of the changes that are being made to the virtual system model. In one embodiment, after the completion of all the various calibration operations, a report is generated to provide a summary of all the adjustments that have been made to the virtual system model.

As described above, virtual system modeling engine 124 can be configured to model various aspects of the system to produce predicted values for the operation of various components within monitored system 102. These predicted values can be compared to actual values being received via data acquisition hub 112. If the differences are greater than a certain threshold, e.g., the DTT, but not in an alarm condition, then a calibration instruction can be generated. The calibration instruction can cause a calibration engine 134 to update the virtual model being used by system modeling engine 124 to reflect the new operating information.

It will be understood that as monitored system 102 ages, or more specifically the components comprising monitored system 102 age, then the operating parameters, e.g., currents and voltages associated with those components will also change. Thus, the process of calibrating the virtual model based on the actual operating information provides a mechanism by which the virtual model can be aged along with the monitored system 102 so that the comparisons being generated by analytics engine 118 are more meaningful.

Figure 9:
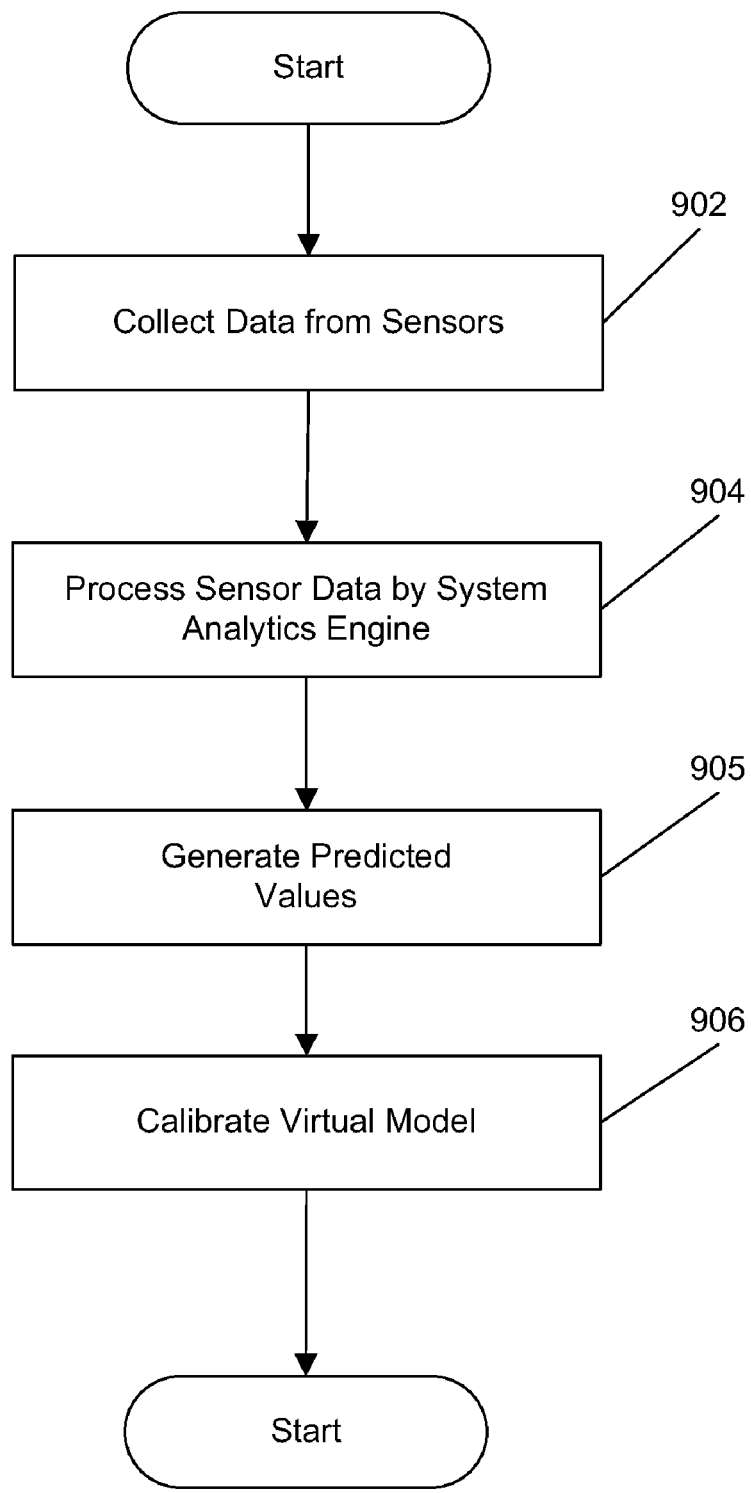
FIG. 9 is a flow chart illustrating an example method for updating the virtual model in accordance with one embodiment.

At a high level, this process can be illustrated with the aid of FIG. 9, which is a flow chart illustrating an example method for updating the virtual model in accordance with one embodiment. In step 902, data is collected from, e.g., sensors 104, 106, and 108. For example, the sensors can be configured to monitor protective devices within an electrical distribution system to determine and monitor the ability of the protective devices to withstand faults, which is describe in more detail below.

In step 904, the data from the various sensors can be processed by analytics engine 118 in order to evaluate various parameters related to monitored system 102. In step 905, simulation engine 124 can be configured to generate predicted values for monitored system 102 using a virtual model of the system that can be compared to the parameters generated by analytics engine 118 in step 904. If there are differences between the actual values and the predicted values, then the virtual model can be updated to ensure that the virtual model ages with the actual system 102.

It should be noted that as the monitored system 102 ages, various components can be repaired, replaced, or upgraded, which can also create differences between the simulated and actual data that is not an alarm condition. Such activity can also lead to calibrations of the virtual model to ensure that the virtual model produces relevant predicted values. Thus, not only can the virtual model be updated to reflect aging of monitored system 102, but it can also be updated to reflect retrofits, repairs, etc.

Figure 10:
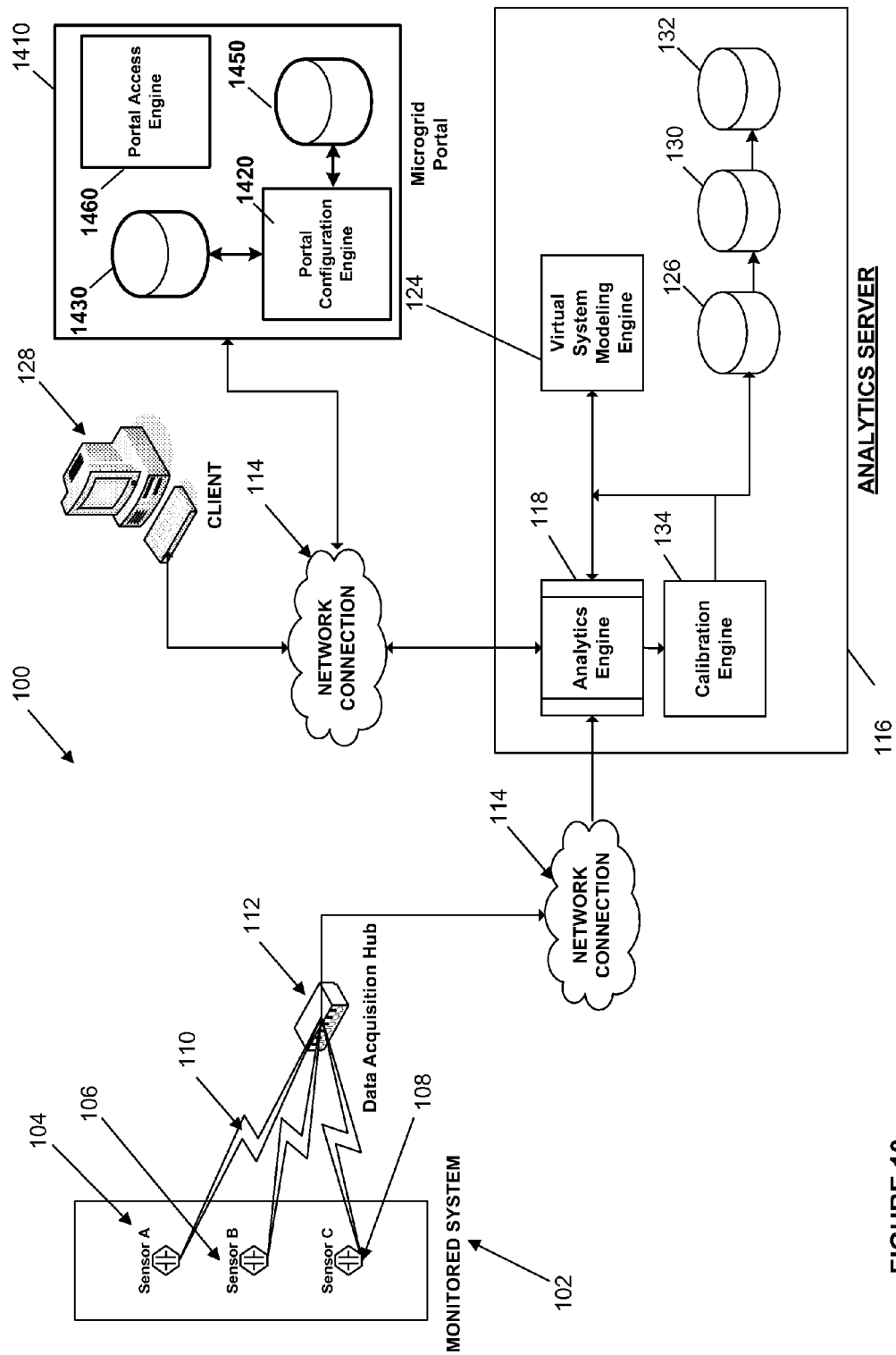
FIG. 10 illustrating how a microgrid portal works in conjunction with other elements of the analytics system.

FIG. 10 illustrates how a microgrid portal works in conjunction with other elements of the analytics system. The system illustrated in FIG. 10 is similar to that illustrated in FIG. 1, except that a microgrid portal 1410 has been added to facilitate the connection between the sensors 104, 106, and 108 interfaced with the monitored system and the analytics server 116. According to an embodiment, the microgrid portal 1410 includes a portal configuration engine 1420, a device driver database 1430, and a client configuration data store 1450. Some embodiments of the microgrid portal 1410 also include a portal access engine 1460.

The device driver database 1430 can store a plurality of vendor specific drivers that can be used to interface with the various proprietary interfaces used by the sensor systems 104, 106, and 108 interfaced with the components of a microgrid. For example, the sensors systems can include data acquisition units, metering devices, sensors, and other devices configured to collect data from various components of the monitored system 102. While FIG. 10 merely illustrates an example that includes three sensor devices interfaced with the monitored system 102, in a typical microgrid, hundreds if not thousands of sensors could be interfaced with the various components of the electrical system. Many of these devices may include proprietary, vendor specific interfaces. The device driver database 1430 can be configured to store device drivers that are configured to interface with each of the different types of sensor devices that might be interfaced with components of an electrical system. Additional device drivers can be added to the device driver database 1430 as additional types of sensor devices are encountered or new versions of devices drivers are released.

The device driver database 1430 allows the microgrid portal 1410 to interface with a wide variety of sensor devices. In some embodiments, developers could also write new or improved device drivers and upload the device drivers to the device driver database 1430. Because the microgrid portal 1410 is non-platform or technology specific operators may be encouraged to mix and match the best of breed technologies and break free from vendor specific architectures. This can facilitate the growth of the global market for microgrid technologies, because the microgrid portal overcomes the challenges of integrating vendor-specific, proprietary systems that in the past could result in isolated islands of data that could not be shared between microgrid operators. The microgrid portal 1410 facilities the sharing of data between microgrid providers via the portal and can allow for more accurate pricing of electricity on the electricity market, because the microgrid operators can share analytical information that can be used to more accurately price electricity.

Portal configuration engine 1420 is configured to interface with analytics server 116. In some embodiments, the functionality of the microgrid portal 1410 can be implemented on the same server computer system as the analytics server 116. In an embodiment the portal configuration engine 1420 can provide an interface to the analytic server 116 that allows the user to select a virtual model of a monitored electrical system from the virtual system model database 126 of the analytics server 116. In an embodiment, the portal configuration engine 1420 is configured to establish a secure network connection 114 over a network to the analytics server 116. In an embodiment, the analytics server 116 can be installed at the site of the monitored system, in other embodiments, the analytics server 116 can be installed a separate site from the monitored system e.g. a secure network operations center (NOC).

According to an embodiment, the portal configuration engine 1420 can be configured to request a copy of the virtual model of the monitored system from the analytics server 116 over the network connection 114, to receive the virtual model over the network connection 114, to parse the virtual model to identify sensor devices deployed on the electrical network, and to automatically select a device driver from the device driver database 1430 for each of the sensor devices identified in the virtual model. For example, the device driver database 1430 can be implemented as a relational database that associates device drivers with various identifying attributes of sensor devices, such as device manufacturer, serial number or part number, device type, and/or other information. When the portal configuration engine 1420 encounters a sensor device in the virtual model, the portal configuration engine 1420 attempts to match the sensor device to an entry in the device driver database 1430 to find a device driver that can interface with the sensor and collect and/or interpret data received from that sensor. The portal configuration engine 1420 can be configured to create a list of those sensor devices for which a matching driver could not be found, and present the list of drivers to an operator. In some embodiments, the portal configuration engine 1420 can be configured to provide a device driver selection interface that allows an operator to select an appropriate driver for a sensor device.

According to an embodiment, the portal configuration engine 1420 can prompt the user to upload an appropriate device driver for a sensor device for which a matching device driver could not be found in the device driver database 1430. In an embodiment, the portal configuration engine 1420 can be configured to conduct an Internet search for an appropriate device driver for a sensor device, and download the driver and/or prompt an operator to verify that a driver found during the search is appropriate for the device found. The device driver can be downloaded (e.g. from a device manufacturer's website) and added to the device driver database 1430.

According to an alternative embodiment, a user can select a virtual model of an electrical system and the user can be prompted to manually select an appropriate device driver for each of the plurality of sensor devices. However, the number of sensor devices included on an electrical system could be too large for it to be practical for a user to select the appropriate device driver for each device.

Once a device driver has been identified for each of the sensor devices, the portal configuration engine 1420 can use this information to configure the analytics server 116 with the appropriate device drivers for interfacing with the sensor devices. In FIG. 5, the analytics server is shown to have various protocol drivers 516, 518, and 520 for interfacing with various types of sensor devices. The portal configuration engine 1420 can send the appropriate device drivers for the sensor devices from the device driver database 1430 via the network connection 114 to the analytics server 116. The analytic server 116 can install the device drivers and use the drivers to interface with the sensor devices. In an embodiment, the analytics server 116 is configured to update a set of virtual interface configuration files that define which device driver should be used to interface with each type of sensor device. The virtual interface configuration files can also define which device driver should be used to process a particular type of sensor data received by the analytics server 116.

The portal configuration engine 1420 can also create a client configuration file that includes the configuration information, such as which device drivers are being used for a client, which types of sensors are being used. The information in the client configuration file can be used to recreate a particular client configuration if the configuration of the analytics server 116 is lost or compromised. The information in the client configuration file can also be used to identify which clients are using which device drivers. In some embodiments, if an update to a device driver is added to the device driver database 1430, the portal configuration engine 1420 can identify which clients are using the device driver based on the client configuration file information and send the updated device drivers to the client's analytics engine.

Portal access engine 1460 can be configured to provide an interface for a user to interact with the microgrid portal. For example, in some embodiments, the portal access engine 530 can be configured to receive real-time data, analytics data, and predicted data from the analytics server and display the data to an operator on a display of the client terminal 128. In an embodiment, the interface provided by the portal access engine 1460 can comprise a set of web pages. In an embodiment, the portal access engine 1460 can be configured to request data from the analytics server 1460 to be displayed on the client terminal 128. For example, in some embodiments, the portal access engine 1460 can be configured to send a request for content to the secure web server 530 of the analytics server and receive data for the variety of user views and functions 532 supported by the analytics server. In some embodiments, the analytics server can be configured to push data to the microgrid portal 1410 across the network connection 114 and the portal access engine 1460 can be configured to format and transmit the content to the client terminal 128 for display.

In an embodiment, the portal access engine 1460 can localize content received from the analytics engine based on the geographic location and/or preferences of a particular client. For example, the information presented by the portal access engine 1460 can be generated in a preferred language and/or the data can be time stamped in relation to a particular time zone where the operator or facility being monitored is located. The portal access engine 1460 can also be configured to perform other types of localization on the information presented. For example, the portal access engine 1460 can be configured to generate reports in particular formats required by local regulations or law.

The portal access engine 1460 can also be configured to share information with other microgrid operators and/or with the macrogrid in order to provide more accurate market pricing of electricity based on more accurate predictions of microgrid capacity provided through the microgrid portal. In the past, market pricing in electrical systems that included distributed energy solutions such as microgrids often did not have current analytical information regarding the capacity and load on the microgrid.

Figure 11:
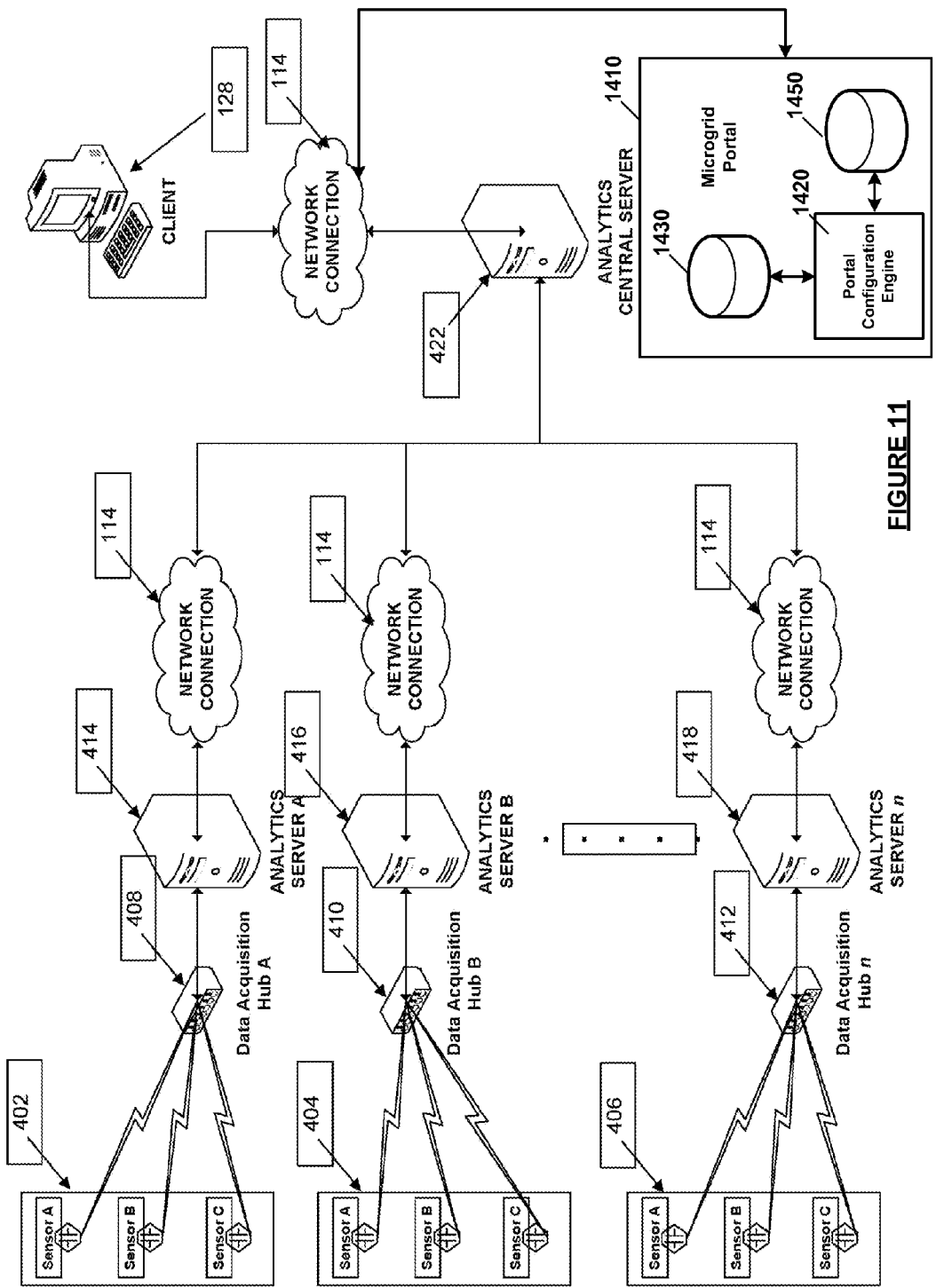
FIG. 11 is another diagram illustrating how a microgrid portal works in conjunction with other elements of the analytics system.

FIG. 11 is another diagram illustrating how a microgrid portal 1410 works in conjunction with other elements of the analytics system. While the embodiment illustrated in FIG. 10 is of a similar configuration as that of FIG. 4, microgrid portal 1410 is instead interfaced with analytics central server 422 that is interfaced with a plurality of analytics servers. The interaction between the microgrid portal 1410 and the analytics central server 422 is similar to the interactions between the microgrid portal 1410 and the analytics server 116 described above with respect to FIG. 10

The embodiment illustrated in FIG. 11 illustrates a configuration that is similar to the electrical network configuration illustrated in FIG. 4 where multiple electrical systems are monitored, and the monitored systems can comprise microgrid systems. According to some embodiments, the microgrid systems can be located at different geographic locations. For example, a state university system can use microgrid systems on multiple campuses. Sensors coupled to components of each microgrid system can provide real-time data regarding the operational characteristics of each of the microgrids. According to an embodiment, each of the monitored systems can have a separate virtual model associated with that system and the central analytics server 422 can provide a virtual model for each of the monitored systems to the microgrid portal 1410 so that the portal configuration engine 1420 can select appropriate drivers for the sensor devices used in each monitored system.

According to an embodiment, the portal configuration engine 1420 can be configured to send all of the device drivers to for all of the monitored systems to the central analytics server 422 and the central analytics server 422 can be configured to send the device drivers to the appropriate analytics servers for installation. In other embodiments, the portal configuration engine 1420 can be configured to send the drivers for each of the analytics servers directly to each analytic server over the network connection 114.

Figure 12:
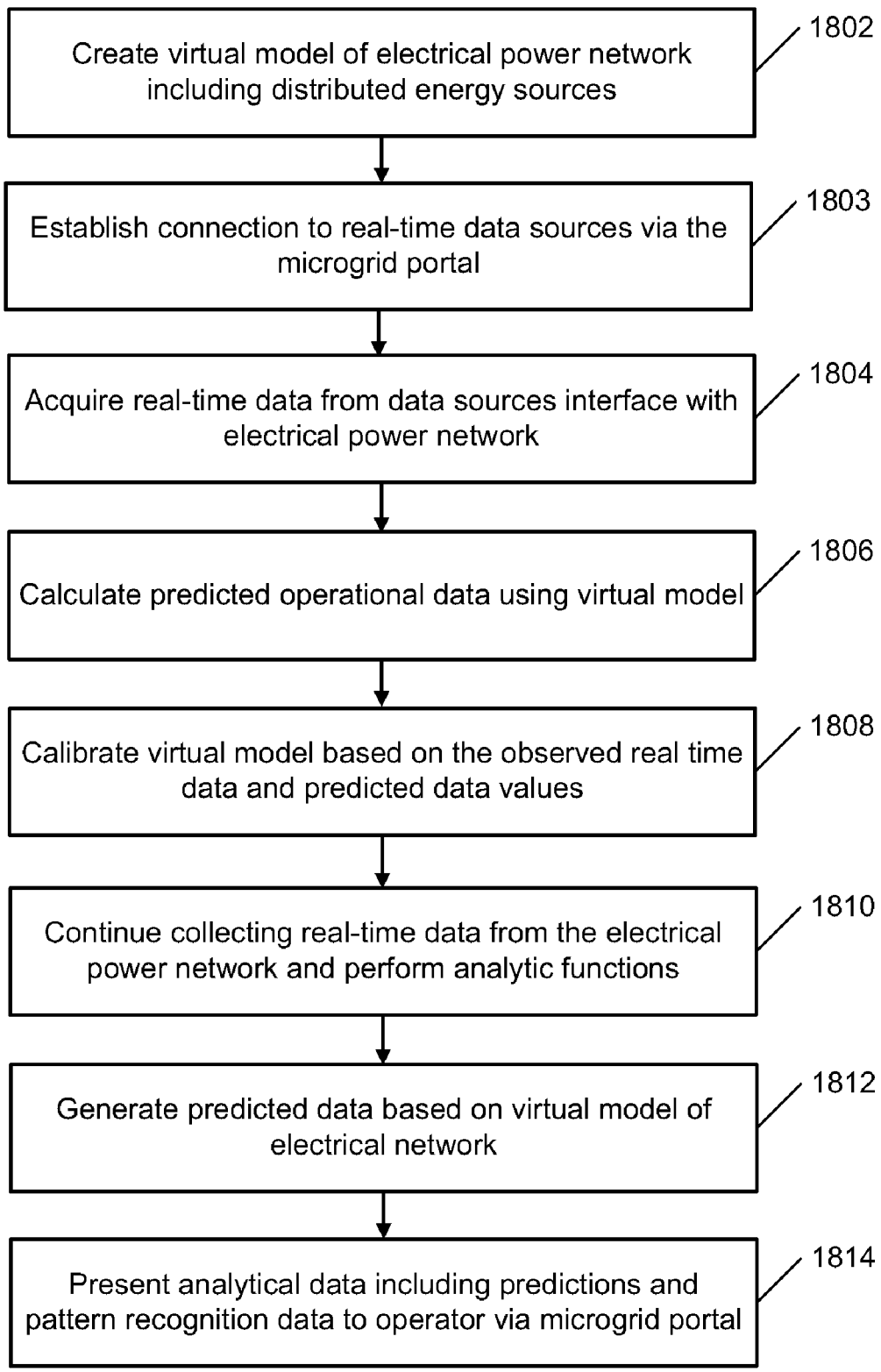
FIG. 12 is a flow diagram of a process for operating a real-time microgrid power analytics portal according to an embodiment.

FIG. 12 is a flow diagram of a process for operating a real-time microgrid power analytics portal according to an embodiment. A virtual system model of a microgrid can be created that includes logical models of the components of the microgrid including distributed energy generation solutions (step 1802). The virtual system model can include components for modeling reliability, modeling voltage stability, and modeling power flow of the microgrid. According to some embodiments, a plurality of virtual system models that represent discrete parts of the electrical power system can be created. In an example, the distributed energy generation solutions included in a microgrid might include solar panels, wind turbines, other on-premise energy generation solutions, or a combination thereof. The virtual model of the microgrid can be used to generate predicted data for the microgrid, including predicted capacity and utilization. Based on predicted capacity and utilization, predictions regarding the cost of operation can also be generated using the cost of generating power at the microgrid and the cost of purchasing power from the macrogrid. These costs can be offset by the sale of electricity generated by excess capacity to the public utilities on the macrogrid.

Figure 13:
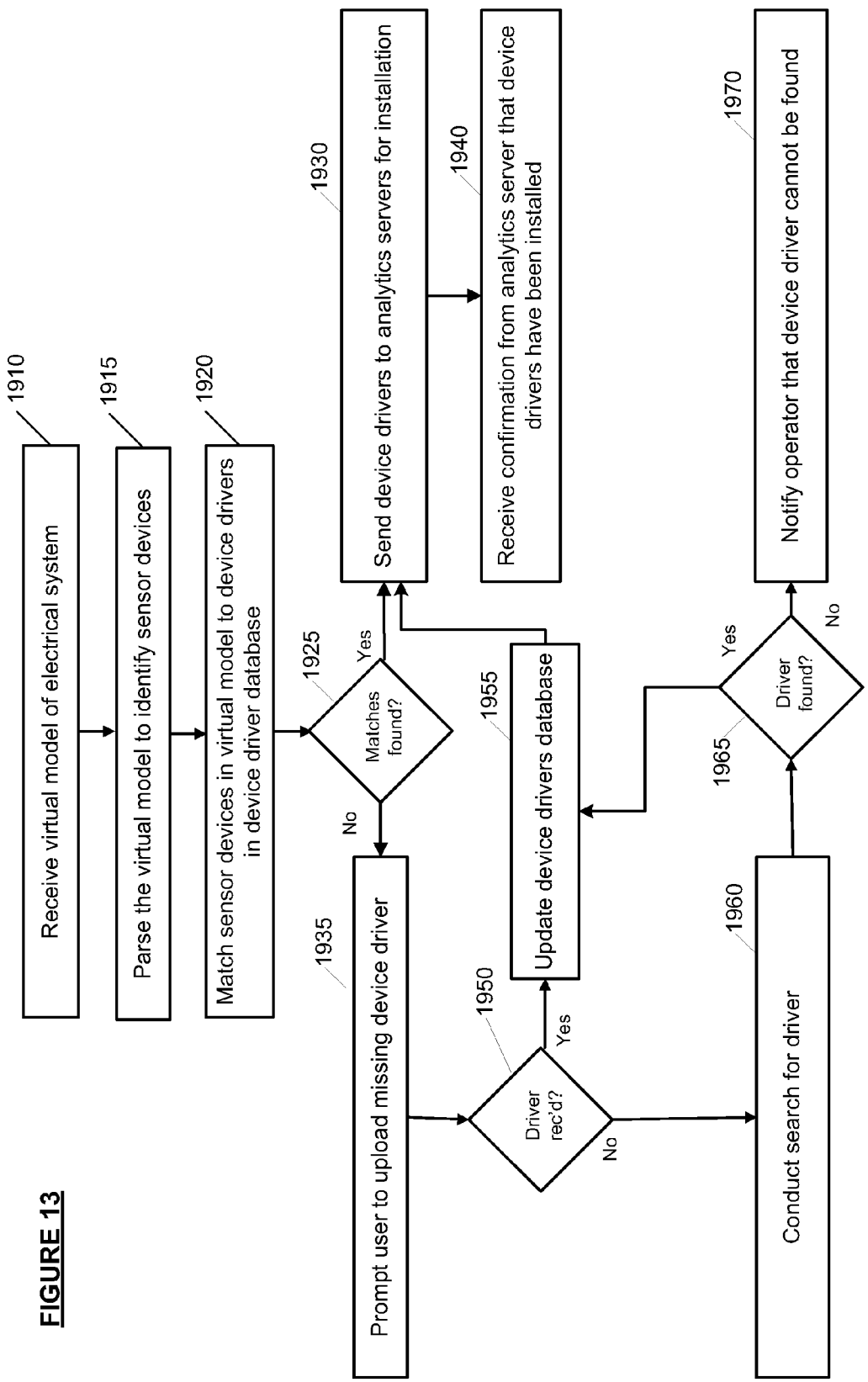
FIG. 13 is a flow chart illustrating an example process for predicting, in real-time, various aspects associated with distributed energy solutions, in accordance with one embodiment.

Once the virtual model or models of the electrical system have been created, a connection to real-time data sources can be established via the microgrid portal (step 1803). The microgrid portal 1410 can request a copy of the virtual model from the analytics server 116, parse the virtual model to identify sensor devices, retrieve an appropriate device driver for the sensor devices, and provide those device drivers to the analytics server for installation. A method for establishing the connection to the real-time data sources is illustrated in FIG. 13 and is described in detail below.

Once the connections to the real-time data sources have been established, real-time data can be collected from sensors interfaced with various components of the electrical system (step 1804). As described above, the sensors can be configured to provide output values for system parameters that indicate the operational status and/or health of the monitored systems. In some embodiments, data can be collected from multiple monitored systems. Each monitored system can have a data acquisition hub that collects data from the sensor interfaced with components of that system and that sends the data across a network connection to a central analytics server.

As described above, the microgrid analytics portal provides an interface for seamlessly communicating with sensors and data collecting devices interface with various components of the smart grid. The sensors or data collecting devices can comprise equipment from multiple different vendors having proprietary interfaces. The analytics portal provides an open architecture where a driver for interfacing with a specific sensor or data collection device can be written once and reused The virtual model or models of the electrical system can be used to calculate predicted operational values for the electrical system (step 1806). For example, the virtual model can be used for modeling reliability, modeling voltage stability, and modeling power flow of the electrical system. The predicted data can be used to generate market-based pricing predictions based on the performance of the components of the electrical system. For example, if the predicted utilization exceeds the predicted capacity of the microgrid, electricity from the macrogrid may need to be purchased to meet the excess utilization. Alternatively, utilization might need to be curtailed to prevent utilization from exceeding the generation capacity of the microgrid.

The predicted data generated by the virtual system model can be compared with real-time sensor data collected from the electrical system and the virtual model can be calibrated with the real-time data to ensure that the virtual system model provide data output that is consistent with the actual real-time data (step 1808). According to an embodiment, decision engine 212 can be configured to look for significant deviations between the predicted values and the real-time values as received. According to an embodiment, if the real-time sensor data and the predicted values generated by the virtual system model diverge beyond a predetermined threshold, an alarm condition can be generated to alert a system administrator that the virtual system model is out of synch with the real-time model of the network. According to an embodiment, if the real-time sensor data and the predicted values generated by the virtual system model diverge beyond a predetermined threshold, a calibration request can be generated that is sent to the calibration engine 134, which will cause the calibration engine 134 to calibrate the virtual model. For example, the predicted capacity for a microgrid could vary from the real-time data collected from the microgrid if system changes have been made to a distributed generation resource, components of a distributed generation resource are undergoing routing maintenance, or an unplanned outage of one or more components of the distributed generation resource has occurred. Calibrating the virtual model of the electrical system to match the real-time model of the system can result in increasingly accurate prediction data being generated using the virtual model.

Once the virtual model has been calibrated, the analytics server 116 can be configured to continue collecting real-time data from the electrical power network and performing analytic functions on the collected data (step 1810). The virtual model can be used to generated predicted performance on the microgrid based on the real-time parameters collected (1812). For example, predicted capacity, load, and energy mix data can be generated using the virtual model. Other types of predicted data can be generated using the virtual model including predicted cost of operating the microgrid. A detailed description of the types of predicted data that can be generated are described in detail above. The collected data, the real-time data, and analyzed data processed using various analytics algorithms can be presented to an operator at the terminal device 128 by portal access engine 1460 (step 1814). Various analytics algorithms including pattern recognition algorithms can be applied to the real-time data acquired from the microgrid. The pattern recognition algorithms can be used to identify potential problems in the microgrid system. The pattern recognition algorithms can also be used to identify various trends in the operational status of the microgrid, such as patterns of available capacity, patterns of electricity utilization, trends related to distributed energy source efficiencies, and/or other trends that may be relevant to an operator of the microgrid.

FIG. 13 is a flow diagram of a process for establishing real-time connections with sensor devices according to an embodiment. The method illustrated in FIG. 13 can be used to implement step 1803 of FIG. 12, described above.

The portal access engine 1460 receives a copy of a virtual model of the microgrid system (step 1910). In some embodiments, the portal access engine 1460 provides a device driver upload user interface that allows an operator or administrator of a microgrid power system to access a client account on the microgrid portal and to upload a virtual model of the electrical system. In some embodiments, the portal access engine 1460 can be configured to interface with the analytics server 116 over the network connection 114 to request a copy of the virtual model of the system from the analytics server 116. In an embodiment, the virtual system modeling engine 124 can access the virtual model database 126 and send a copy of the virtual model to the microgrid portal 1410.

The portal access engine 1460 can parse the virtual model to identify sensor devices deployed on the microgrid electrical system (step 1915). As described above, an electrical system can include hundreds, or even thousands, of sensor devices that are interfaced with components of the electrical system, and the sensor devices can comprise a mix of proprietary data types. The portal access engine 1460 can then attempt to match the sensor devices from the virtual model to device drivers stored in the device driver database 1430 (step 1920). For example, the device driver database 1430 can be implemented as a relational database that associates device drivers with various identifying attributes of sensor devices, such as device manufacturer, serial number or part number, device type, and/or other information. When the portal configuration engine 1420 encounters a sensor device in the virtual model, the portal configuration engine 1420 can attempt to match the sensor device to an entry in the device driver database 1430 to find a device driver that can interface with the sensor and collect and/or interpret data received from that sensor.

A determination is made by the portal access engine 1460 whether the portal access engine 1460 has found matching device drivers in the device driver database 1430 for each of the sensor devices included in the virtual model (step 1925). If a match was found for all of the sensor devices, the portal access engine 1460 can send access the device driver database 1430 to retrieve the device drivers and send the device drivers to the analytics server 116 for installation (step 1930). In some embodiments, the analytics server 116 can be configured to send a confirmation message to the microgrid portal 1410 indicating that the device drivers have been received and installed on the analytics server 116. The microgrid portal 1410 can receive the confirmation message from the analytics server 116 (step 1940). If the installation failed, the analytics server 116 can send a message to the microgrid portal 1410 indicating that an error occurred. The microgrid portal 1410 can be configured to send the message to the client terminal 128 for display to an operator who may be able to correct the problem or request technical assistance in correcting the problems with the device drivers.

If a match was not found for one or more sensor devices, the portal access engine 1460 can be configured to prompt the operator to upload the missing device driver (step 1935). As described above, the portal access engine 1460 can be configured to provide a user interface for uploading a device driver for a sensor device to the device driver database 1430.

A determination is made by the portal access engine 1460 whether the missing device driver has been uploaded (step 1950). If the device driver has been uploaded by the administrator, the device driver can be added to the device driver database (step 1955) where the device driver can be used to support future instances of microgrids that include that type of sensor device.

Alternatively, the portal access engine 1460 can be configured to conduct a search for the driver (step 1960). For example the portal access engine 1460 can be configured to search the Internet for a compatible device driver. For example, the manufacturer of the device might include provide downloadable device drivers on the manufacturer's website (step 1965). In an embodiment, step 1960 may include sending the search results to a human technician or to the operator to make a determination whether any of the search results include a device driver compatible with the sensor device. The portal access engine 1460 can then make a determination whether the device driver has been found (step 1965). If the device driver has been found, the device driver can be added to the device driver database 1430 (step 1955). In embodiments where the search results are reviewed by a human technician or by the operator at client terminal 128, the technician or operator can manually upload the device driver using the interface provide by the portal access engine 1460.

If an appropriate device driver could not be found, the operator can be notified that a suitable device driver could not be found for one or more sensor devices (step 1970). In some embodiments, the portal access engine 1460 will not send any device drivers to the analytics server 116 until all of the device drivers are found. In an alternative embodiment, the portal access engine 1460 can be configured to send the device drivers that are available to the analytics server 116 for installation. This would allow the analytics server 116 to be able to begin collecting real-time information from the sensor devices for which devices drivers were available and allow for at least limited monitoring and analytics to be performed for the system until a complete set of device drivers can be located. If the missing device drivers are later located or in some instances programmed, the device drivers can be manually uploaded by an operator using the interface provided by the portal access engine 1460, and the portal access engine 1460 can send the device drivers to any analytics servers 116 that require that device driver.

The embodiments described herein, can be practiced with other computer system configurations including hand-held devices, microprocessor systems, microprocessor-based or programmable consumer electronics, minicomputers, mainframe computers and the like. The embodiments can also be practiced in distributing computing environments where tasks are performed by remote processing devices that are linked through a network.

It should also be understood that the embodiments described herein can employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations that form part of the embodiments described herein are useful machine operations. The invention also relates to a device or an apparatus for performing these operations. The systems and methods described herein can be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The embodiments described herein can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Certain embodiments can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although a few embodiments of the present invention have been described in detail herein, it should be understood, by those of ordinary skill, that the present invention may be embodied in many other specific forms without departing from the spirit or scope of the invention. Therefore, the present examples and embodiments are to be considered as illustrative and not restrictive, and the invention is not to be limited to the details provided therein, but may be modified and practiced within the scope of the appended claims.

What is claimed:

1. A system for real-time modeling of electrical system performance of a microgrid electrical system, comprising:
   a plurality of sensors interfaced with components of the electrical system;
   an analytics server, comprising a virtual system modeling engine configured to generate predicted data output for the electrical system utilizing a virtual system model of the electrical system; and
   a microgrid portal comprising
      a device driver database configured to store a plurality of device drivers associated with sensors interfaced with components of an electrical system,
      a portal configuration engine configured to
         receive a copy of the virtual model of the electrical system,
         parse the virtual model of the electrical system to identify sensor devices interfaced with components of the electrical system,
         identify device drivers in the device driver database that can be used to interface each sensor device with the analytics server, and
         send the identified device drivers to the analytics server, wherein the analytics server is configured to receive the device drivers from the portal configuration engine, install the device drivers, and establish a bidirectional communication link with the plurality of sensors interfaced with components of the electrical system using the device drivers, and
      a portal access engine configured to receive real-time data, analytics data, and predicted data from the analytics server and display the data to an operator on a display of the client terminal.

2. The system of claim 1 wherein the analytics server further comprises:
   an analytics engine configured to monitor real-time data output and the predicted data output of the electrical system, the analytics engine further configured to initiate a calibration and synchronization operation to update the virtual system model when a difference between the real-time data output and the predicted data output exceeds a threshold.

3. The system of claim 1 wherein the portal configuration engine provides a virtual model upload interface that allows a user to upload a virtual model of an electrical system to be parsed by the portal configuration engine.

4. The system of claim 1 wherein the portal configuration engine is further configured to:
   request a copy of the virtual model of the electrical system from the analytics server via a network connection; and
   receive a copy of the virtual model from the analytics server via the network connection.

5. The system of claim 1 wherein the portal configuration engine provides a device driver upload interface that allows a user to upload a device driver for a sensor device, and wherein the portal configuration module is configured to add the device driver to the device driver database.

6. The system of claim 5 wherein the portal configuration engine is configured to prompt a user to upload a device driver if a device driver for a sensor device included in the virtual model is not found in the device driver database.

7. The system of claim 1 wherein the portal configuration engine is configured to execute an online search for a device driver if a device driver for a particular sensor device is not found in the device driver database.

8. The system of claim 7 wherein the portal configuration engine is configured to upload the device driver into the device driver database if the device driver is found by the online search.

9. A computer implemented method for real-time modeling of the performance of a microgrid electrical system, the method comprising comprising:
   by one or more processors of a microgrid portal,
      receiving a virtual model of a microgrid electrical system,
      parsing the virtual model of the microgrid electrical system to identify a plurality of sensor devices interfaced with components of the microgrid electrical system,
      identifying device drivers in a device driver database, wherein the device drivers can be used to interface each sensor device with an analytics server,
      sending the identified device drivers to the analytics server,
      receiving real-time data, analytics data, and predicted data for the microgrid electrical system from the analytics server, and
      providing the received real-time data, analytics data, and predicted data to an operator; and
   by one or more processors of the analytics server,
      receiving and installing the device drivers on the analytics server,
      establishing a bidirectional communication link with a plurality of sensors interfaced with components of the microgrid electrical system using the device drivers,
      acquiring the real-time data from the plurality of sensors using the device drivers, and
      generating the predicted data for the microgrid electrical system utilizing the virtual model of the microgrid electrical system.

10. The method of claim 9, wherein generating predicted data output comprises:
   calculating predicated data forecasting the performance of the microgrid electrical system; and
   initiating a calibration and synchronization operation to update the virtual model when a difference between the real-time data and the predicted data exceeds a threshold.

11. The method of claim 10, further comprising:
acquiring additional real-time data from sensors interfaced with components of the microgrid electrical system;
generating additional predicted data regarding the performance of the microgrid electrical system using the calibrated virtual model; and
presenting the additional predicted data, the additional real-time data, and pattern recognition data on a display of a client terminal.

12. The method of claim 9 further comprising:
displaying a virtual model upload interface that allows a user to upload a copy of a virtual model of an electrical system to be parsed; and
receiving the copy of the virtual model via the interface.

13. The method of claim 9 further comprising:
requesting a copy of the virtual model of the electrical system from the analytics server via a network connection; and
receiving a copy of the virtual model from the analytic server via the network connection.

14. The method of claim 9 further comprising:
displaying a device driver upload interface that allows a user to upload a device driver for a sensor device;
receiving a device driver uploaded via the device driver user interface; and
adding the device driver to the device driver database.

15. The method of claim 13 further comprising:
displaying a message prompting a user to upload a device driver if a device driver for a sensor device included in the virtual model is not found in the device driver database.

16. The method of claim 9 further comprising:
automatically executing an online search for a device driver if a device driver for a particular sensor device is not found in the device driver database.

17. The method of claim 16 further comprising:
uploading the device driver into the device driver database if the device driver is found by the online search.

* * * * *